(12) United States Patent
Levert, Jr. et al.

(10) Patent No.: US 10,422,196 B2
(45) Date of Patent: Sep. 24, 2019

(54) HYDRAULIC FLUID DISTRIBUTION ASSEMBLY

(71) Applicant: Cameron International Corporation, Houston, TX (US)

(72) Inventors: Michael Levert, Jr., Katy, TX (US); Kyle Sommerfeld, Houston, TX (US)

(73) Assignee: CAMERON INTERNATIONAL CORPORATION, Houston, TX (US)

( * ) Notice: Subject to any disclaimer, the term of this patent is extended or adjusted under 35 U.S.C. 154(b) by 86 days.

(21) Appl. No.: 15/683,565

(22) Filed: Aug. 22, 2017

(65) Prior Publication Data
US 2019/0063174 A1 Feb. 28, 2019

(51) Int. Cl.
| | |
|---|---|
| *E21B 34/02* | (2006.01) |
| *F16K 11/076* | (2006.01) |
| *E21B 33/038* | (2006.01) |
| *E21B 34/10* | (2006.01) |
| *F16K 11/085* | (2006.01) |
| *F16L 39/04* | (2006.01) |
| *E21B 33/047* | (2006.01) |
| *E21B 43/14* | (2006.01) |

(52) U.S. Cl.
CPC ............ *E21B 33/038* (2013.01); *E21B 34/02* (2013.01); *E21B 34/102* (2013.01); *F16K 11/076* (2013.01); *F16K 11/0856* (2013.01); *E21B 33/047* (2013.01); *E21B 43/14* (2013.01); *F16L 39/04* (2013.01)

(58) Field of Classification Search
CPC ...................... F16K 11/074; Y10T 137/86863
USPC ............ 137/625.19, 625.23, 625.46, 625.47
See application file for complete search history.

(56) References Cited

U.S. PATENT DOCUMENTS

| | | | |
|---|---|---|---|
| 8,567,378 B2 | 10/2013 | Nugent | |
| 2005/0133216 A1* | 6/2005 | Bartlett | E21B 23/04 166/66.4 |
| 2010/0282348 A1* | 11/2010 | Sharp | F16K 11/07 137/625.46 |
| 2017/0370482 A1* | 12/2017 | Lynch | F16K 31/1221 |

* cited by examiner

*Primary Examiner* — Giovanna C Wright
(74) *Attorney, Agent, or Firm* — Fletcher Yoder, P.C.

(57) ABSTRACT

A system includes a rotatable fluid distribution system having a first block and a second block, the first block is configured to receive a supply of pressurized fluid, the second block is configured to distribute the supply of pressurized fluid to one or more actuators of a running tool, a wellhead component, or both, and the first block and the second block are configured to rotate with respect to one another about an axis to adjust which of the one or more actuators of the running tool, the wellhead component, or both, receives the supply of pressurized fluid.

14 Claims, 13 Drawing Sheets

HYDRAULIC FLUID DISTRIBUTION ASSEMBLY

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Oil and natural gas have a profound effect on modern economies and societies. In order to meet the demand for such natural resources, numerous companies invest significant amounts of time and money in searching for, accessing, and extracting oil, natural gas, and other subterranean resources. Particularly, once a desired resource is discovered below the surface of the earth, drilling and production systems are often employed to access and extract the resource. These systems can be located onshore or offshore depending on the location of a desired resource. Such systems generally include a wellhead assembly through which the resource is extracted. These wellhead assemblies generally include a wide variety of components and/or conduits, such as blowout preventers (BOPs), as well as various control lines, casings, valves, and the like, that control drilling and/or extraction operations.

Hangers (e.g., tubing hangers or casing hangers) and other wellhead components (e.g., tubing spool, casing spool, packoff assembly, valves, seal assemblies, lock members, actuators, accumulators, blowout preventers (BOPs), pumps, plugs, a wellhead assembly, etc.) may be used to support sections or strings of casing or tubing within a wellhead assembly. In addition, hangers may regulate pressures and provide a path for hydraulic control fluid, chemical injections, or the like to be passed through the wellhead and into the well bore. In such a system, various seals (e.g., annular seals) are often disposed between various components of the wellhead system, such as the tubing spool, casing spool, casing hanger, tubing hanger, pack off assembly, and so forth (e.g., wellhead components), to regulate and isolate pressure between such components. Unfortunately, installation of such seals may be time consuming, costly, and/or complex.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

Figure 1:
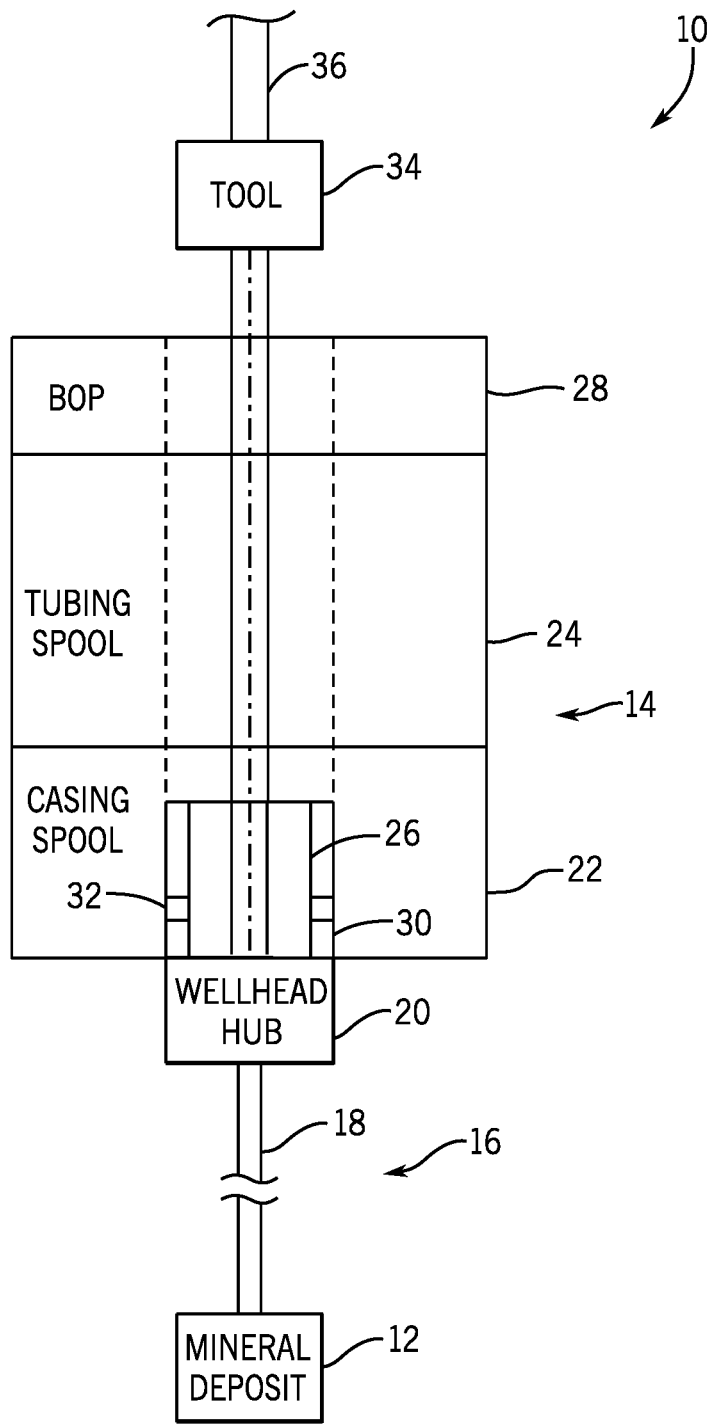
FIG. 1 is a schematic of an embodiment of a mineral extraction system, in accordance with an aspect of the present disclosure.

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Moreover, the use of "top," "bottom," "above," "below," and variations of these terms is made for convenience, but does not require any particular orientation of the components.

Running tools that are utilized to dispose various tubulars (e.g., hangers slip tools, etc.) and/or wellhead components (e.g., tubing hangers, casing hangers, tubing spool, casing spool, packoff assembly, valves, seal assemblies, lock members, actuators, accumulators, blowout preventers (BOPs), pumps, plugs, a wellhead assembly, etc.) may include a large number of control lines that may actuate various features of the running tool and/or the wellhead component. For example, some running tools may be actuated through hydraulic pressure and/or pneumatic pressure. Therefore, control lines may be configured to send and/or receive hydraulic fluid and/or pneumatic fluid (e.g., air) to and from the running tool. Unfortunately, control lines may increase a size of the running tool, increase costs, increase a difficulty of operation, increase setup and running time, and/or add complexity to manufacturing the running tool.

Therefore, the presently disclosed embodiments relate to a running tool that is configured to reduce a number of control lines by enabling a control line to supply hydraulic fluid (or pneumatic fluid) to the running tool and actuate various components of the running tool and/or a wellhead component (e.g., tubing hangers, casing hangers, tubing spool, casing spool, packoff assembly, valves, seal assemblies, lock members, actuators, accumulators, blowout preventers (BOPs), pumps, plugs, a wellhead assembly, etc.). Additionally, the running tool may include a control line configured to return the hydraulic fluid (or pneumatic fluid) from the running tool once the hydraulic fluid has been utilized to actuate the target component. In order to reduce the number of control lines, the running tool may include a rotatable fluid distribution system (e.g., rotating blocks or cylinders) that may control which component of the running tool and/or the wellhead component the control line actuates via the hydraulic fluid (or pneumatic fluid). For example, the rotatable fluid distribution system may include rotating blocks that are coaxial with one another. A first block of the rotating blocks may move circumferentially about the other block (e.g., rotate independent of the other block) to align a hydraulic fluid supply line (e.g., the control line) with a fluid passage that controls a target component of the running tool and/or wellhead component. The hydraulic fluid (or pneumatic fluid) may supply pressure to the target component and circulate the hydraulic fluid back to a supply of hydraulic fluid (or pneumatic fluid) via a vent passage (e.g., an outlet control line). As such, the running tool may include two control lines that may actuate various components of the running tool and/or the wellhead component. Reducing the number of control lines may reduce the size, cost, difficulty of operation, setup and running time, and/or complexity of the running tool.

While the present disclosure focuses discussion on applying embodiments of the fluid distribution system to a running tool, it should be noted that the disclosed embodiments of the fluid distribution system may be utilized in other applications. For example, embodiments of the fluid distribution system may be utilized in systems that supply hydraulic fluid from a source to a load (e.g., a tool). As non-limiting examples, the disclosed fluid distribution system may be utilized in brake systems for vehicles, power steering systems for vehicles, systems that utilize hydraulic motors, systems that include hydraulic valves, systems that utilize hydraulic pumps, and/or other suitable hydraulic systems. In any case, the disclosed embodiments of the fluid distribution system reduce a number of hydraulic lines that may be included in a hydraulic system, thereby facilitating assembly, operation, and/or maintenance of the hydraulic system.

FIG. 1 is a schematic of an exemplary mineral extraction system 10 configured to extract various natural resources, including hydrocarbons (e.g., oil and/or natural gas), from a mineral deposit 12. Depending upon where the natural resource is located, the mineral extraction system 10 may be land-based (e.g., a surface system) or subsea (e.g., a subsea system). The illustrated system 10 includes a wellhead assembly 14 coupled to the mineral deposit 12 or reservoir via a well 16. Specifically, a wellbore 18 extends from the reservoir 12 to a wellhead hub 20 located at or near the surface.

The illustrated wellhead hub 20, which may be a large diameter hub, acts as an early junction between the well 16 and the equipment located above the well. The wellhead hub 20 may include a complementary connector, such as a collet connector, to facilitate connections with the surface equipment. The wellhead hub 20 may be configured to support various strings of casing or tubing that extend into the wellbore 18, and in some cases extending down to the mineral deposit 12.

The wellhead 14 generally includes a series of devices and components that control and regulate activities and conditions associated with the well 16. For example, the wellhead 14 may provide for routing the flow of produced minerals from the mineral deposit 12 and the wellbore 18, provide for regulating pressure in the well 16, and provide for the injection of chemicals into the wellbore 18 (downhole). In the illustrated embodiment of FIG. 1, the wellhead 14 includes a casing spool 22 (e.g., tubular), a tubing spool 24 (e.g., tubular), a seal assembly 26 (e.g., to provide a seal between a hanger and/or another component and the casing spool 22), and a blowout preventer (BOP) 28.

In operation, the wellhead 14 enables completion and workover procedures, such as tool insertion into the well 16 for installation and removal of various components (e.g., hangers, shoulders, packoffs, etc.). Further, minerals extracted from the well 16 (e.g., oil and natural gas) may be regulated and routed via the wellhead 14. For example, the blowout preventer (BOP) 28 may include a variety of valves, fittings, and controls to prevent oil, gas, or other fluid from exiting the well 16 in the event of an unintentional release of pressure or an overpressure condition.

As illustrated, the casing spool 22 defines a bore 30 that enables fluid communication between the wellhead 14 and the well 16. Thus, the casing spool bore 30 may provide access to the wellbore 18 for various completion and workover procedures, such as emplacing tools or components within the casing spool 22. To emplace the components, a shoulder 32 provides a temporary or permanent landing surface that can support wellhead components (e.g., tubing hangers, casing hangers, tubing spool, casing spool, packoff assembly, valves, seal assemblies, lock members, actuators, accumulators, blowout preventers (BOPs), pumps, plugs, a wellhead assembly, etc.). For example, the illustrated embodiment of the extraction system 10 includes a tool 34 suspended from a drill string 36. In certain embodiments, the tool 34 may include running tools (e.g., seal assembly running tools, hanger running tools, shoulder running tools, slip tools, etc.) that are lowered (e.g., run) to the well 16, the wellhead 14, and the like. The seal assembly 26 may be installed on the shoulder 32 and used to seal components that may be utilized to support sections of casing or tubing within the wellhead assembly 14.

As discussed above, some running tools may include numerous control lines that may increase a size, cost, or complexity of the running tool 34. Control lines of the running tool 34 may be utilized to actuate the running tool 34 and/or a wellhead component (e.g., tubing hangers, casing hangers, tubing spool, casing spool, packoff assembly, valves, seal assemblies, lock members, actuators, accumulators, blowout preventers (BOPs), pumps, plugs, a wellhead assembly, etc.) by supplying pressure (e.g., hydraulic pressure, pneumatic pressure, etc.) to one or more actuators of the running tool 34 and/or the wellhead component. Additionally, other control lines may be configured to supply electrical power to components and/or otherwise provide an electrical connection between various components (e.g., sensors or electrically actuated components) and a control system. Embodiments of the present disclosure relate to a running tool 34 that may include a reduced number of control lines by including a rotatable fluid distribution system 100 (e.g., rotating blocks or cylinders) that may be configured to supply pressure to a plurality of components through an input control line and an output control line. The output control line may vent the pressure and/or otherwise return pressurized fluid (e.g., hydraulic fluid or pneumatic fluid) to a storage or supply tank.

Figure 2:
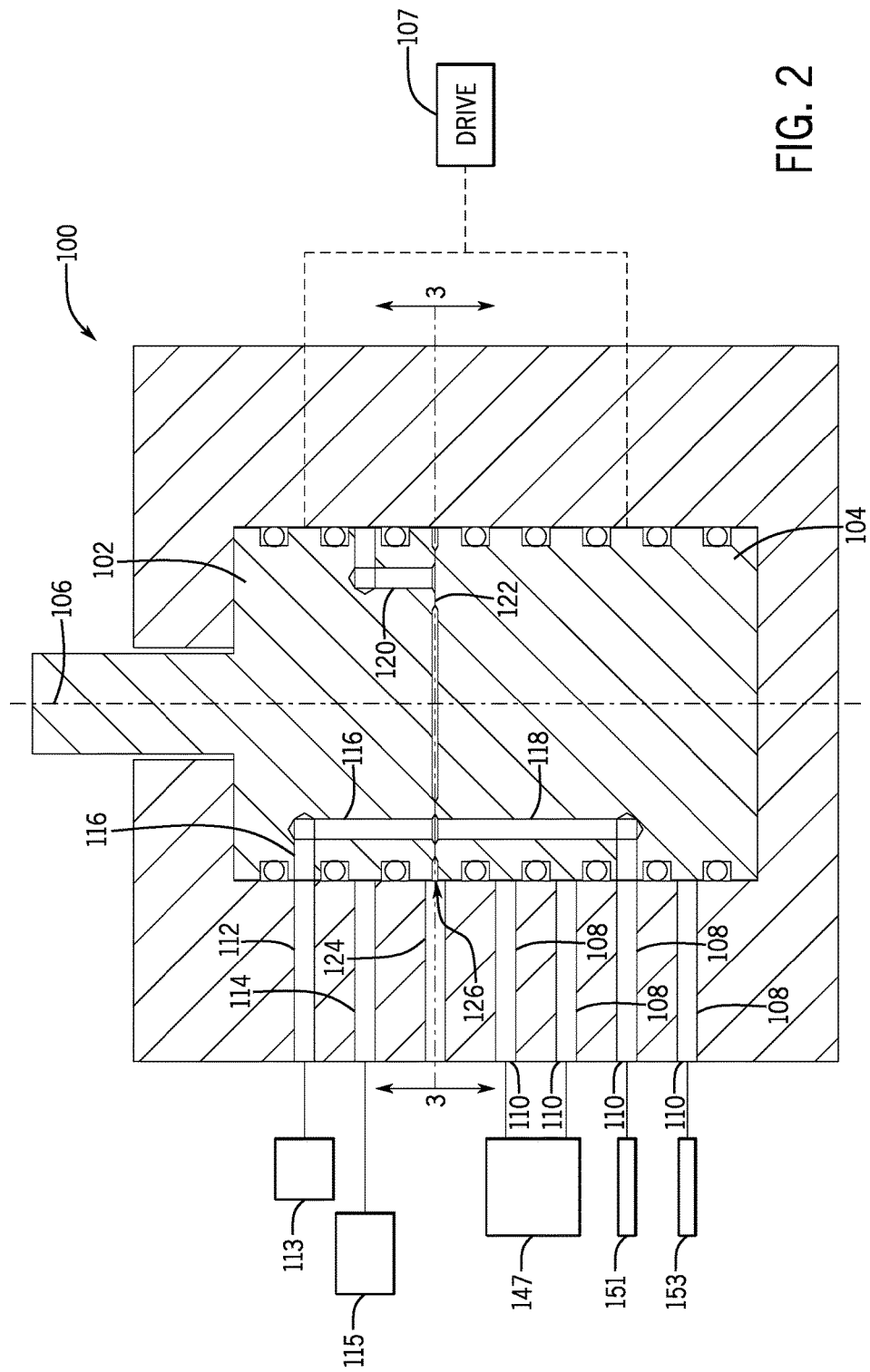
FIG. 2 is a section schematic of an embodiment of a rotatable fluid distribution system that may be utilized to reduce a number of control lines in a running tool, in accordance with an aspect of the present disclosure.

For example, FIG. 2 is a section schematic of an embodiment of the rotatable fluid distribution system 100 that may be utilized to reduce a number of control lines in the running tool 34. As shown in the illustrated embodiment, the rotatable fluid distribution system 100 may include a first block 102 (e.g., a first cylinder) and a second block 104 (e.g., a second cylinder), where the first block 102 and the second block 104 are coaxial. In some embodiments, the first block 102 may be configured to rotate about a central axis 106 of the first block 102 and the second block 104 while the second block 104 remains substantially stationary. In other embodiments, the second block 104 may be configured to rotate about the axis 106 while the first block 102 remains substantially stationary. In still further embodiments, both the first block 102 and the second block 104 may be configured to rotate about the axis 106 or any other form of relative rotation between the first block 102 and the second block 104 may be utilized. In some embodiments, a drive 107 (e.g., an electric motor, a pneumatic motor, or another suitable device) may be configured to rotate the first block 102, the second block 104, or both about the axis 106.

In any case, rotation of the first block 102 and/or the second block 104 may enable the running tool 34 to supply pressure to a target (e.g., desired) component to actuate the target component. As a non-limiting example, the running tool 34 may be configured to supply pressure (e.g., hydraulic pressure or pneumatic pressure) to engage (e.g., energize) a lock member of the running tool 34 (e.g., a radial locking dog, a lock ring, a wedge ring), to disengage (e.g., un-energize) the lock member, engage one or more seals of a seal assembly of a wellhead component (e.g., tubing hangers, casing hangers, tubing spool, casing spool, packoff assembly, valves, seal assemblies, lock members, actuators, accumulators, blowout preventers (BOPs), pumps, plugs, a wellhead assembly, etc.), engage a locking component of the wellhead component (e.g., a radial locking dog, a lock ring, a wedge ring), among others.

In some embodiments, the first block 102 and the second block 104 of the rotatable fluid distribution system 100 may be utilized to perform a sequence of steps that may be used to install a wellhead component, actuate a valve and/or other wellhead component, and/or perform another suitable task. For example, the first block 102 and the second block 104 may rotate relative to one another to sequentially supply pressurized fluid to test a seal, drive an actuator in an axial direction (e.g., a piston), drive an actuator in a circumferential direction, drive an actuator in a radial direction, store pressure in an accumulator, and/or any other suitable function in any sequential order. The actuators (e.g., hydraulic actuators, pneumatic actuators, electric actuators) may be configured to actuate a component of the running tool 34 (e.g., a piston, a sleeve or other movable component, a lock member, and/or another suitable component) and/or the wellhead component (e.g., tubing hangers, casing hangers, tubing spool, casing spool, packoff assembly, valves, seal assemblies, lock members, actuators, accumulators, blowout preventers (BOPs), pumps, plugs, a wellhead assembly, etc.). The sequence in which the first block 102 and the second block 104 perform may lock a hanger in the wellhead assembly 14, set a plug in the wellhead assembly 14, secure a tool into the wellhead assembly 14, form a seal within the wellhead assembly 14, actuate a valve of the mineral extraction system 10, among other actions.

In any case, the second block 104 may include a plurality of outlets 108 that may each be coupled to a respective fluid passageway 110 and configured to supply pressure (e.g., hydraulic pressure or pneumatic pressure) to the respective fluid passageway 110, which may ultimately actuate a respective target component (e.g., an actuator, a seal, an accumulator, etc.).

As shown in the illustrated embodiment of FIG. 2, the first block 102 may include an inlet port 112 coupled to a pressurized fluid source 113 and/or a vent port 114 coupled to a fluid discharge tank 115. The inlet port 112 may receive a pressurized fluid (e.g., hydraulic fluid or air) from the pressurized fluid source 113. Further, the inlet port 112 may be coupled to a supply passageway 116 (e.g., a first passageway) of the first block 102 that is ultimately aligned with and coupled to a respective outlet 108 via a passageway 118 (e.g., a second passageway) of the second block 104. As discussed in detail below, the second block 104 may include a plurality of the passageways 118, where each of the plurality of passageways 118 correspond to a respective outlet 108 of the plurality of outlets 108. Accordingly, the supply passageway 116 may be aligned with a respective target passageway 118 that corresponds to a respective target outlet 108 that supplies pressurized fluid to the respective target component. The supply passageway 116 may move among and/or between the plurality of passageways 118 via rotation of the first block 102 with respect to the second block 104, or vice versa.

Additionally, to vent the pressurized fluid from the rotatable fluid distribution system 100, a vent passageway 120 may be aligned with and/or coupled to the vent port 114 and one of the passageways 118. Accordingly, pressurized fluid may flow from a target outlet 108 through a target passageway 118 and discharged through the vent port 114 to the fluid discharge tank 115. As discussed in detail below, the first block 102 and/or the second block 104 may be rotated with respect to one another in order to align the vent passageway 120, the vent port 114, a respective passageway 118, and a respective outlet 108 in order to vent the pressurized fluid from a target component and out of the rotatable fluid distribution system 100 (e.g., to the fluid discharge tank 115).

Further, a seal 122 (e.g., a face seal, an annular seal, or another suitable seal) may be formed between the first block 102 and the second block 104, such that pressurized fluid may not be released from in between the first block 102 and the second block 104. As shown in the illustrated embodiment of FIG. 2, the rotatable fluid distribution system 100 may include a leak detection passageway 124 that may be disposed at an interface 126 of the first block 102 and the second block 104. For example, a leak may be detected should a pressure in the leak detection passageway 124 exceed a threshold value.

Figure 3:
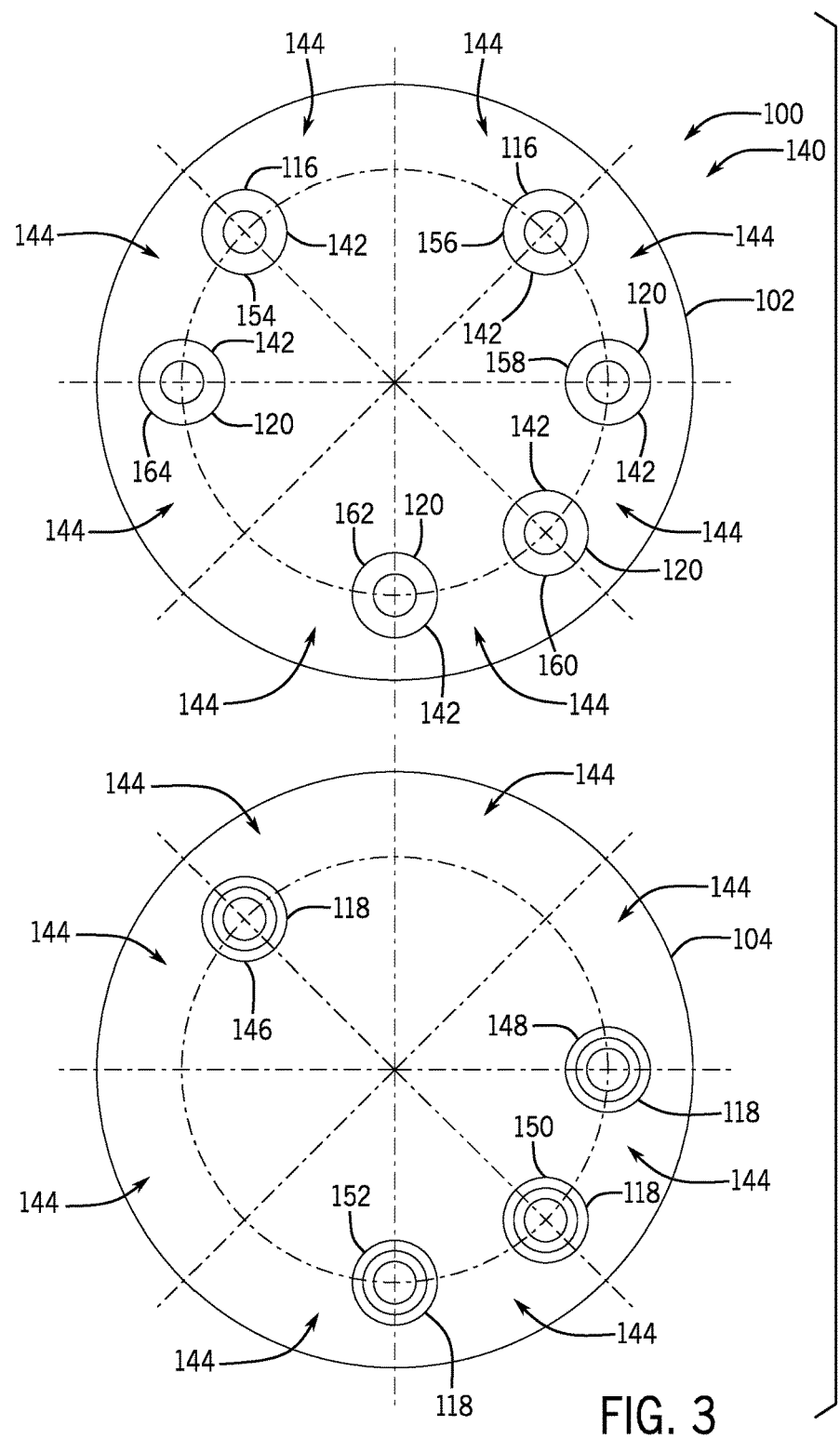
FIG. 3 is a cross section of the rotatable fluid distribution system in a first position taken along line 3-3 of FIG. 2, in accordance with an aspect of the present disclosure.

FIG. 3 is a cross section of the rotatable fluid distribution system 100 taken along line 3-3 of FIG. 2, where the first block 102 and the second block 104 of the rotatable fluid distribution system 100 are in a first position 140. As shown in the illustrated embodiment of FIG. 3, the first block 102 is shown positioned above the second block 104 to clarify the positions (e.g., alignments) of the passageways 116, 118, and/or 120 of both the first block 102 and the second block 104 when in the first position 140. In some embodiments, the first block 102 may include six passageways 142, where two of the passageways 142 may be supply passageways 116 and four of the passageways 142 may be vent passageways 120. Additionally, the second block 104 may include four of the passageways 118. While the illustrated embodiment of FIG. 3 shows the first block 102 having six of the passageways 142 and the second block having four of the passageways 118, in other embodiments, the first block 102 may have more or less than six passageways 142 (e.g., 1, 2, 3, 4, 5, 7, 8, 9, 10, or more of the passageways 142) and the second block 104 may have more or less than four of the passageways 118 (e.g., 1, 2, 3, 5, 6, 7, 8, 9, 10, or more of the passageways 118).

In any case, when one or both of the supply passageways 116 is aligned with one or more of the passageways 118, one or more respective target components may be actuated as pressurized fluid is directed to the one or more respective target components. Similarly, when one or more of the vent passageways 120 are aligned with one or more of the passageways 118, pressurized fluid may be discharged from one or more of respective target components and to a fluid source (e.g., a hydraulic fluid tank or reservoir).

As shown in the illustrated embodiment, the passageways 142 and/or 118 may be spaced along equal portions 144 of the first block 102 and the second block 104. In some embodiments, each portion 144 may represent an eighth of the first block 102 and/or an eighth of the second block 104. However, in other embodiments (see, e.g., FIGS. 8-12), the portions 144 may represent other amounts of the first block 102 and/or the second block 104, such as one half, one third, one fourth, one fifth, one sixth, one seventh, one ninth, one tenth, one twelfth, one fifteenth, one twentieth, or any other suitable amount. In still further embodiments, distances between the passageways 142 and/or 118 about the first block 102 and the second block 104 may be unequal.

As a non-limiting example, each of the four passageways 118 may be coupled to a different component. For example, a first passageway 146 may be fluidly coupled to a first actuator 147 (see, e.g., FIG. 2), such as a piston, that controls one or more locking components (e.g., lock dogs) of the running tool 34. The first passageway 146 may be configured to supply pressurized fluid to unsecure (e.g., unenergize and/or decouple) the one or more locking components. As used herein, the one or more locking components may be a component of the running tool 34 that is configured to secure the running tool 34 to a surface of the wellhead assembly 14, such that the running tool 34 may be secure before installing the wellhead component (e.g., tubing hangers, casing hangers, tubing spool, casing spool, packoff assembly, valves, seal assemblies, lock members, actuators, accumulators, blowout preventers (BOPs), pumps, plugs, a wellhead assembly, etc.). Additionally, a second passageway 148 may also be fluidly coupled to the first actuator 147 (e.g., the piston) that controls the one or more locking components (e.g., lock dogs). However, the second passageway 148 may be configured to supply pressurized fluid to engage (e.g., secures) the one or more locking components with the surface of the wellhead assembly 14.

In some embodiments, the first passageway 146 may be configured to move the first actuator 147 (e.g., a piston) in a first axial direction (or a first radial or circumferential direction), such that the one or more locking components are not engaged with the surface of the wellhead assembly 14 (e.g., the actuator 147 retracts the one or more locking components when pressurized fluid is supplied form the first passageway 146). Similarly, the second passageway 148 may be configured to move the first actuator 147 (e.g., the piston) in a second axial direction, opposite the first axial direction (or a second radial or circumferential direction, opposite the first radial or circumferential direction) to engage the one or more locking components with the surface of the wellhead assembly 14. Thus, the first actuator 147 may be disposed in a chamber, and the first passageway 146 may be fluidly coupled to a first end portion of the chamber and the second passageway 148 may be fluidly coupled to a second end portion of the chamber.

A third passageway 150 may be fluidly coupled to a second actuator 151 (see, e.g., FIG. 2) configured to control a seal assembly of the wellhead component, which may be configured to form a seal between a tubular and the wellhead component when the pressurized fluid is supplied to the third passageway 150. For example, pressurized fluid in the third passageway 150 may move the second actuator 151, which may engage the seal assembly to form the seal between the tubular and the wellhead component.

Further, a fourth passageway 152 may be fluidly coupled to a third actuator 153 (see, e.g., FIG. 2) that controls a lock member of the wellhead component, which may be configured to secure the wellhead component in the wellhead assembly 14 and/or to form a seal between the wellhead component and the wellhead assembly 14. Accordingly, pressurized fluid in the fourth passageway 152 may move the third actuator 153 to engage the lock member of the wellhead component to secure the wellhead component hanger in the wellhead assembly 14 (e.g., to a surface of the wellhead assembly 14). While the present discussion focuses on the respective passageways 118 being coupled to the specific components listed above, it should be understood that the respective passageways 118 may be coupled to any suitable component of the mineral extraction system 10 that may be controlled via pressurized fluid (e.g., hydraulic fluid and/or pneumatic fluid).

As shown in the illustrated embodiment of FIG. 3, a first supply passageway 154 (e.g., of the passageways 142) is aligned with the first passageway 146. A second supply passageway 156 (e.g., of the passageways 142) is not aligned with any of the passageways 118. Accordingly, pressurized fluid may be supplied to the first actuator 147 in order to unsecure (e.g., unenergize and/or deactivate) the one or more locking components when the first block 102 and the second block 104 of the rotatable fluid distribution system 100 are in the first position 140. Therefore, when the first block 102 and the second block 104 are in the first position 140, the running tool 34, which may be coupled to the wellhead component (e.g., tubing hangers, casing hangers, tubing spool, casing spool, packoff assembly, valves, seal assemblies, lock members, actuators, accumulators, blowout preventers (BOPs), pumps, plugs, a wellhead assembly, etc.), may be disposed into the wellhead assembly 14 because the one or more locking components may be deactivated. When the one or more locking components are deactivated, the running tool 34 may be disposed into the wellhead assembly 14 without obstruction.

Further, when the first block 102 and the second block 104 are in the first position 140, a first vent passageway 158 (e.g., of the passageways 142) is aligned with the second passageway 148, a second vent passageway 160 (e.g., of the passageways 142) is aligned with the third passageway 150, and a third vent passageway 162 (e.g., of the passageways 142) is aligned with the fourth passageway 152. In some embodiments, a fourth vent passageway 164 (e.g., of the passageways 142) may not be aligned with any of the passageways 118. When the first, second, and third vent passageways 158, 160, and 162 are aligned with the second, third, and fourth passageways 148, 150, and 152, respectively, any pressurized fluid in the second, third, and fourth passageways 148, 150, and 152 may be discharged from the second, third, and fourth passageways 148, 150, and 152. Accordingly, pressurized fluid is not supplied to the second, third, and fourth passageways 148, 150, and 152. Therefore, the one or more locking components of the running tool, the seal assembly of the wellhead component, and/or the lock member of the wellhead component are not engaged when the first block 102 and the second block 104 are in the first position 140.

Figure 4:
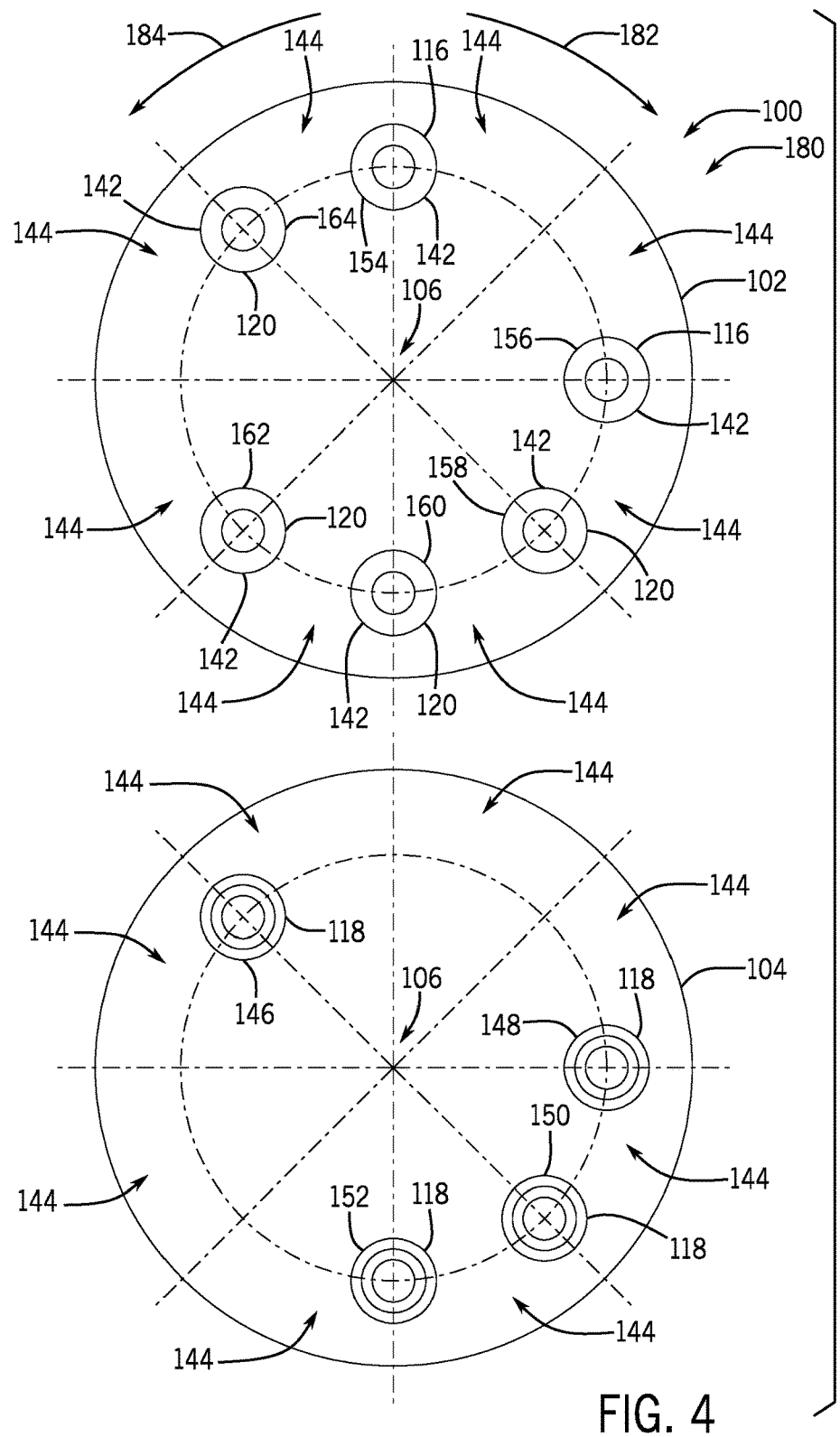
FIG. 4 is a cross section of the rotatable fluid distribution system in a second position taken along line 3-3 of FIG. 2, in accordance with an aspect of the present disclosure.

FIG. 4 is a cross section of the rotatable fluid distribution system 100 taken along line 3-3 of FIG. 2, where the first block 102 and the second block 104 of the rotatable fluid distribution system 100 are in a second position 180. In some embodiments, to move from the first position 140 to the second position 180, the first block 102 and/or the second block 104 may be rotated between 30 degrees and 50 degrees, between 40 degrees and 50 degrees, or approximately (e.g., within 1% of, within 5% of, or within 10% of) 45 degrees with respect to one another. As such, the first block 102 may be rotated about the axis 106 (e.g., in a first circumferential direction 182) while the second block 104 remains substantially stationary, the second block 104 may be rotated about the axis 106 (e.g., in a second circumferential direction 184) while the first block 102 remains substantially stationary, or the first block 102 may be rotated (e.g., in the first circumferential direction 182) about the axis at the same time that the second block 104 is rotated (e.g., in the second circumferential direction 184) about the axis 106.

In any case, as shown in the illustrated embodiment of FIG. 4, the first supply passageway 154 (e.g., of the passageways 142) is not aligned with any of the passageways 118. However, the second supply passageway 156 (e.g., of the passageways 142) is aligned with the second passageway 148. Accordingly, pressurized fluid may be supplied to the first actuator 147 in order to engage the one or more locking components (e.g., lock dogs) of the running tool 34 when the first block 102 and the second block 104 are in the second position 180. Therefore, once the running tool 34 has reached a target position within the wellhead assembly 14, the first block 102 and the second block 104 may be placed into the second position 180 (e.g., via the drive 107), such that pressurized fluid may be directed into the second passageway 148 to engage the one more locking components with the surface of the wellhead assembly 14. Therefore, the running tool 34 may be secured within the wellbore at the target position before engaging the wellhead component with a tubular and/or the wellhead assembly 14.

Further, when the first block 102 and the second block 104 are in the second position 180, the first vent passageway 158 (e.g., of the passageways 142) is aligned with the third passageway 150, the second vent passageway 160 (e.g., of the passageways 142) is aligned with the fourth passageway 152, and the fourth vent passageway 164 (e.g., of the passageways 142) is aligned with the first passageway 146. In some embodiments, the third vent passageway 162 (e.g., of the passageways 142) may not be aligned with any of the passageways 118. When the first, second, and fourth vent passageways 158, 160, and 164 are aligned with the third, fourth, and first passageways 150, 152, and 146 respectively, any pressurized fluid in the third, fourth, and first passageways 150, 152, and 146 may be discharged from the third, fourth, and first passageways 150, 152, and 146. Accordingly, pressurized fluid is not supplied to the third, fourth, and first passageways 150, 152, and 146. As such, the one or more locking components of the running tool 34 are not disengaged, the seal assembly of the wellhead component is not engaged, and the lock member of the wellhead component is not engaged when the first block 102 and the second block 104 are in the second position 180.

Figure 5:
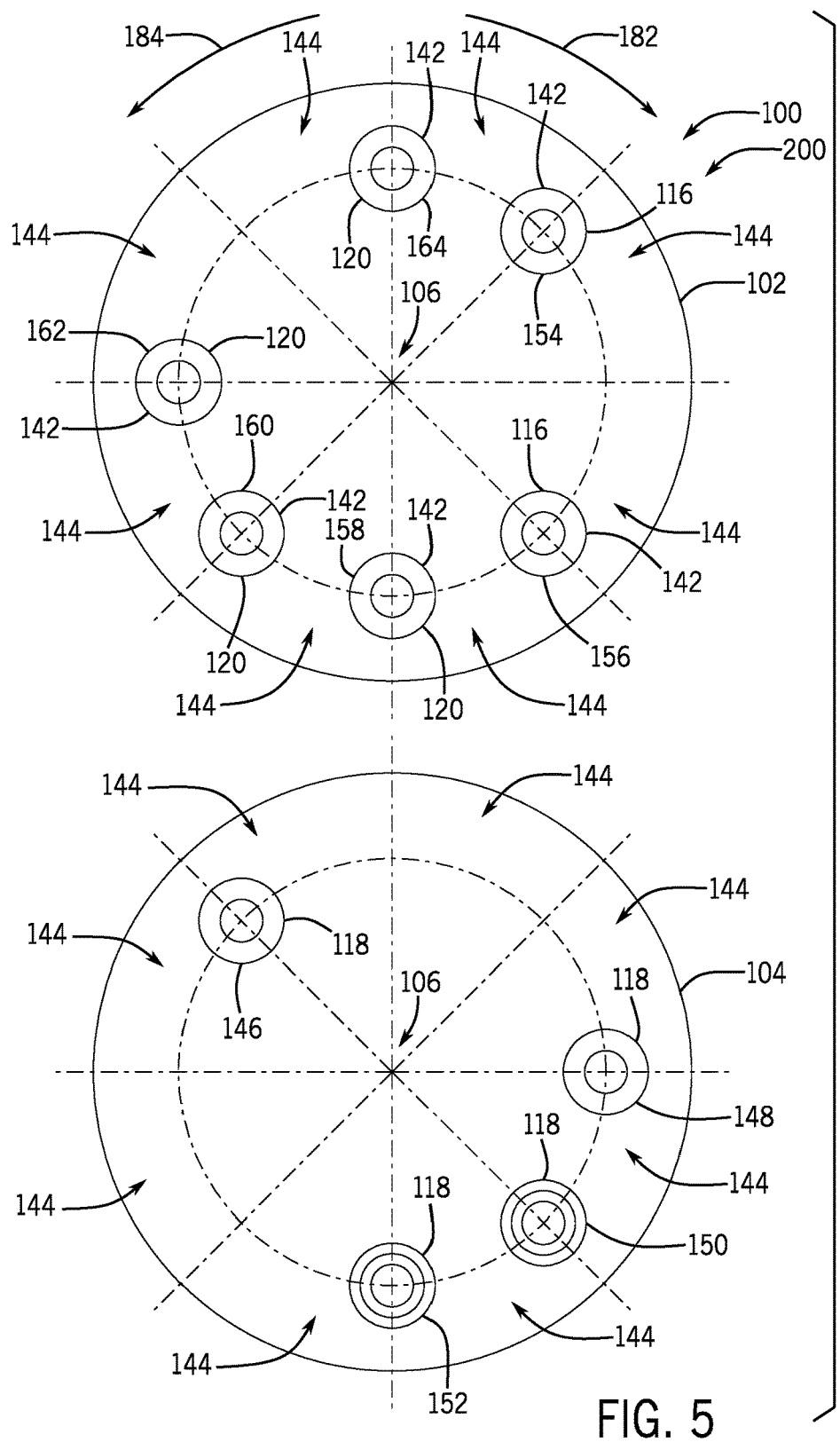
FIG. 5 is a cross section of the rotatable fluid distribution system in a third position taken along line 3-3 of FIG. 2, in accordance with an aspect of the present disclosure.

FIG. 5 is a cross section of the rotatable fluid distribution system 100 taken along line 3-3 of FIG. 2, where the first block 102 and the second block 104 of the rotatable fluid distribution system 100 are in a third position 200. In some embodiments, to move from the second position 180 to the third position 200, the first block 102 and/or the second block 104 may be rotated between 30 degrees and 50 degrees, between 40 degrees and 50 degrees, or approximately (e.g., within 1% of, within 5% of, or within 10% of) 45 degrees with respect to one another. As such, the first block 102 may be rotated about the axis 106 (e.g., in the first circumferential direction 182) while the second block 104 remains substantially stationary, the second block 104 may be rotated about the axis 106 (e.g., in the second circumferential direction 184) while the first block 102 remains substantially stationary, or the first block 102 may be rotated (e.g., in the first circumferential direction 182) about the axis at the same time that the second block 104 is rotated (e.g., in the second circumferential direction 184) about the axis 106.

In any case, as shown in the illustrated embodiment of FIG. 5, the first supply passageway 154 (e.g., of the passageways 142) is not aligned with any of the passageways 118. However, the second supply passageway 156 (e.g., of the passageways 142) is aligned with the third passageway 150. Accordingly, pressurized fluid may be supplied toward the second actuator 151 to engage the seal assembly of the wellhead component. As discussed above, the second actuator 151 may engage the seal assembly of the wellhead component to direct the seal assembly toward a tubular in the wellhead assembly 14. Thus, the seal assembly forms a seal between the wellhead component and the tubular when the first block 102 and the second block 104 are in the third position 200.

Further, when the first block 102 and the second block 104 are in the third position 200, the first vent passageway 158 (e.g., of the passageways 142) is aligned with the fourth passageway 152. The second vent passageway 160, the third vent passageway 162, and the fourth vent passageway 164 may not be aligned with any of the passageways 118. When the first vent passageways 158 is aligned with the fourth passageway 152, any pressurized fluid in the fourth passageway 152 may be discharged from the fourth passageway 152. Accordingly, pressurized fluid is not supplied to the fourth passageway 152 to activate the lock member of the wellhead component when the first block 102 and the second block 104 are in the third position 200. In some embodiments, venting the fourth passageway 152 when actuating the third passageway 150 may enable the running tool 34 to engage the seal assembly and the lock member of the wellhead component separate from one another and ensure a proper seal between the tubular, the wellhead component, and the wellhead assembly 14.

Figure 6:
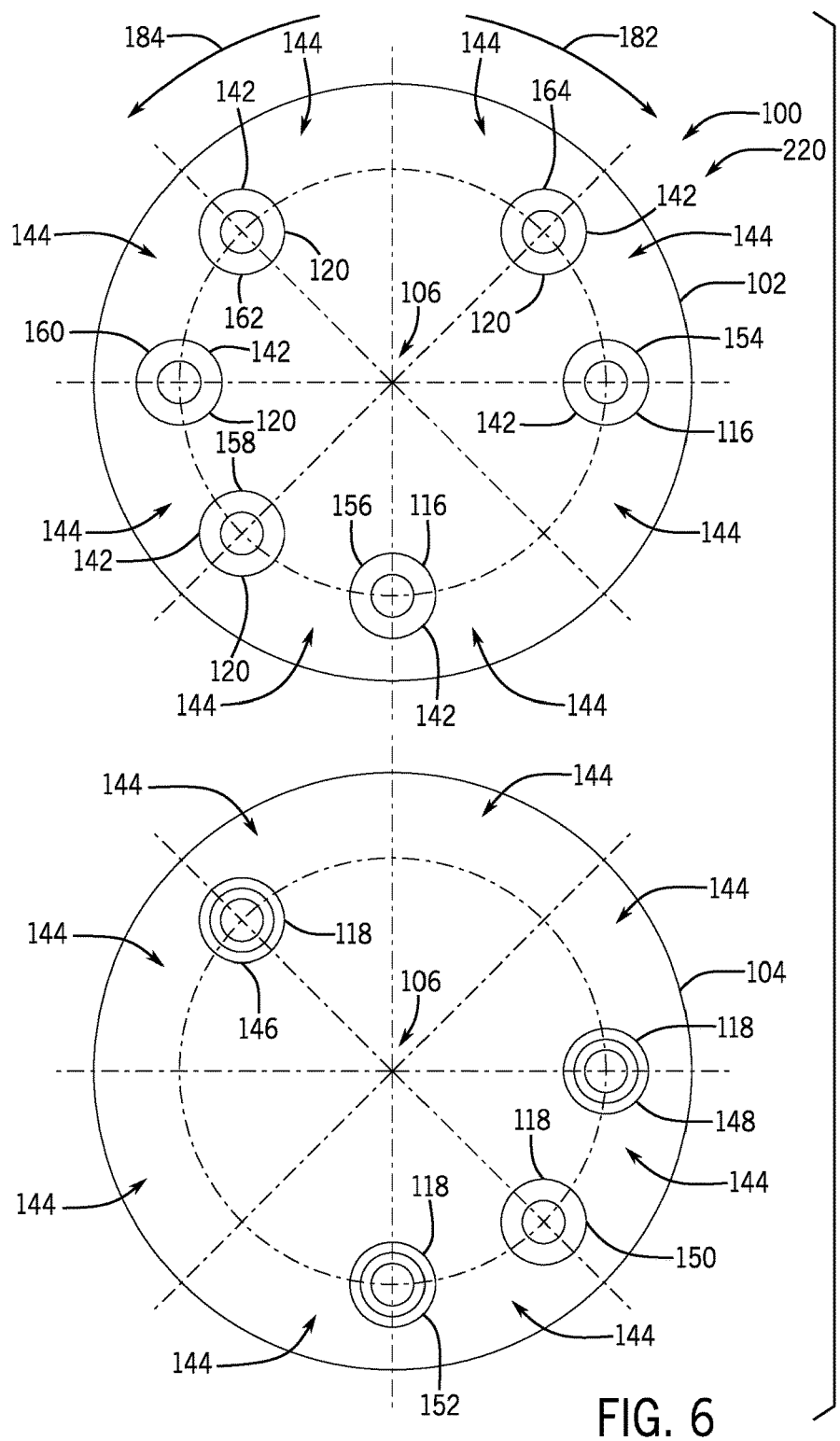
FIG. 6 is a cross section of the rotatable fluid distribution system in a fourth position taken along line 3-3 of FIG. 2, in accordance with an aspect of the present disclosure.

FIG. 6 is a cross section of the rotatable fluid distribution system 100 taken along line 3-3 of FIG. 2, where the first block 102 and the second block 104 of the rotatable fluid distribution system 100 are in a fourth position 220. In some embodiments, to move from the third position 200 to the fourth position 220, the first block 102 and/or the second block 104 may be rotated between 30 degrees and 50 degrees, between 40 degrees and 50 degrees, or approximately (e.g., within 1% of, within 5% of, or within 10% of) 45 degrees with respect to one another. As such, the first block 102 may be rotated about the axis 106 (e.g., in the first circumferential direction 182) while the second block 104 remains substantially stationary, the second block 104 may be rotated about the axis 106 (e.g., in the second circumferential direction 184) while the first block 102 remains substantially stationary, or the first block 102 may be rotated (e.g., in the first circumferential direction 182) about the axis at the same time that the second block 104 is rotated (e.g., in the second circumferential direction 184) about the axis 106.

In any case, as shown in the illustrated embodiment of FIG. 6, the first supply passageway 154 (e.g., of the passageways 142) is aligned with the second passageway 148 and the second supply passageway 156 is aligned with the fourth passageway 152. Accordingly, the one or more locking components of the running tool 34 and the lock member of the wellhead component may both be engaged when the first block 102 and the second block 104 are in the fourth position 220. In some embodiments, because the one or more locking components of the running tool 34 are already engaged, supplying the pressurized fluid to the second passageway 148 may not create a significant effect, but may serve to reinforce the securement of the running tool 34 in the wellhead assembly 14 while the lock member of the wellhead component is engaged.

Further, when the first block 102 and the second block 104 are in the fourth position 220, the third vent passageway 162 (e.g., of the passageways 142) is aligned with the first passageway 146. However, the first vent passageway 158, the second vent passageway 160, and the fourth vent passageway 164 may not be aligned with any of the passageways 118. When the third vent passageways 162 is aligned with the first passageway 146, any pressurized fluid in the first passageway 146 may be discharged from the first passageway 146. Accordingly, pressurized fluid is not supplied to the first passageway 146, such that the one or more locking components of the running tool 34 are not disengaged (e.g., pressurized fluid is supplied to the second passageway 148 to engage the one or more locking components) when the first block 102 and the second block 104 are in the fourth position 220. As shown in FIGS. 3-6, when a supply passageway 154 and/or 156 is aligned with the first passageway 146, a vent passageway 158, 160, 162, and/or 164 is aligned with the second passageway 148, and vice versa. Accordingly, pressurized fluid is not supplied to the first actuator 147 to both engage and disengage the one or more locking components of the running tool 34 when the rotatable fluid distribution system is in a given position.

In some embodiments, the first block 102 and the second block 104 may be adjusted back to the first position 140 from the fourth position 220 in order to remove the running tool 34 from the wellhead assembly 14 (e.g., while the wellhead component is still in the wellhead assembly 14). In some embodiments, to move from the fourth position 220 to the first position 140, the first block 102 and/or the second block 104 may be rotated between 120 degrees and 240 degrees, between 130 degrees and 230 degrees, approximately (e.g., within 1% of, within 5% of, or within 10% of) 135 degrees, or approximately (e.g., within 1% of, within 5% of, or within 10% of) 225 degrees with respect to one another. As such, the first block 102 may be rotated about the axis 106 (e.g., in the first circumferential direction 182 or the second circumferential direction 184) while the second block 104 remains substantially stationary, the second block 104 may be rotated about the axis 106 (e.g., in the first circumferential direction 182 or the second circumferential direction 184) while the first block 102 remains substantially stationary, or the first block 102 may be rotated (e.g., in the first circumferential direction 182 or the second circumferential direction 184) about the axis at the same time that the second block 104 is rotated (e.g., in the opposite circumferential direction of the first block 102) about the axis 106.

In any case, the first supply passageway 154 (e.g., of the passageways 142) is aligned with the first passageway 146. Accordingly, pressurized fluid may be supplied to the first actuator 147 in order to unsecure (e.g., unenergize and/or deactivate) the one or more locking components of the running tool 34 when the first block 102 and the second block 104 are in the first position 140. Therefore, when the first block 102 and the second block 104 are in the first position 140, the running tool 34, which may be decoupled from the wellhead component, may be removed from the wellhead assembly 14 because the one or more locking components may be disengaged from the surface of the wellhead assembly 14. When the one or more locking components are deactivated, the running tool 34 may be removed from the wellhead assembly 14 without obstruction.

Figure 7:
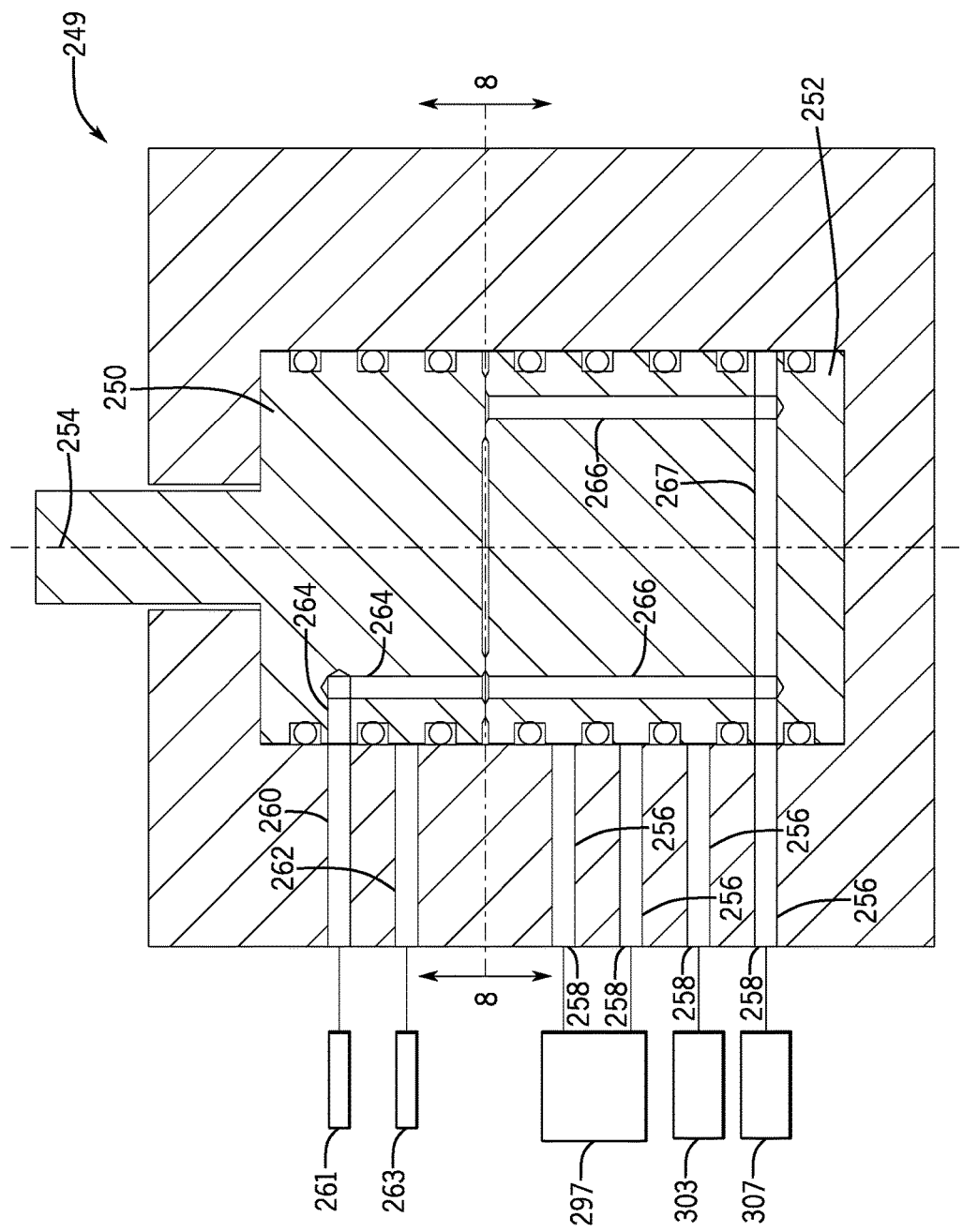
FIG. 7 is a section schematic of an embodiment of the rotatable fluid distribution system that may be utilized to reduce a number of control lines in a running tool, in accordance with an aspect of the present disclosure.

FIG. 7 is a schematic of an embodiment of the rotatable fluid distribution system 249 that includes a first block 250 (e.g., a first cylinder) and a second block 252 (e.g., a second cylinder). The rotatable fluid distribution system 249 of FIG. 7 may be utilized to reduce an amount of rotation to achieve a sequence of operations, enable the blocks 250 and 252 to repeat the sequence of operations without rotating to a starting position (e.g., an initial position), and/or enable unidirectional rotation of the blocks 250 and 252. In some embodiments, the first block 250 may be configured to rotate about a central axis 254 of the first block 250 and the second block 252 while the second block 252 remains substantially stationary. In other embodiments, the second block 252 may be configured to rotate about the axis 254 while the first block 250 remains substantially stationary. In still further embodiments, both the first block 250 and the second block 252 may be configured to rotate about the axis 254.

In any case, rotation of the first block 250 and/or the second block 252 may enable the running tool 34 to supply pressure to a target (e.g., desired) component to actuate the target component. As a non-limiting example, the running tool 34 may be configured to supply pressure (e.g., hydraulic pressure or pneumatic pressure) to engage (e.g., energize) a lock dog of the running tool 34, to disengage (e.g., unenergize) the lock dog of the running tool 34, engage one or more seals of a wellhead component (e.g., tubing hangers, casing hangers, tubing spool, casing spool, packoff assembly, valves, seal assemblies, lock members, actuators, accumulators, blowout preventers (BOPs), pumps, plugs, a wellhead assembly, etc.), engage a locking component of the wellhead component, among others. Accordingly, the second block 252 may include a plurality of outlets 256 that may each be coupled to a respective fluid passageway 258 and configured to supply pressure (e.g., hydraulic pressure or pneumatic pressure) to the respective fluid passageway 258, which may ultimately actuate a respective target component.

As shown in the illustrated embodiment of FIG. 7, the first block 250 may include an inlet port 260 coupled to a pressurized fluid source 261 and/or a vent port 262 coupled to a fluid discharge tank 263. The inlet port 260 may receive a pressurized fluid (e.g., hydraulic fluid or air) from the pressurized fluid source 263. Further, the inlet port 260 may be coupled to a supply passageway 264 (e.g., one or more passageways) of the first block 250 that is ultimately aligned with and coupled to a respective outlet 256 via a passageway 266 (e.g., one or more passageways) of the second block 252. As discussed in detail below, the second block 252 may include a plurality of the passageways 266, where each of the plurality of passageways 266 correspond to a respective outlet 256 of the plurality of outlets 256. Accordingly, the supply passageway 264 may be aligned with a respective target passageway 266 that corresponds to a respective target outlet 256 that supplies pressurized fluid to the respective target component. The supply passageway 264 may move among and/or between the plurality of passageways 266 via rotation of the first block 250 with respect to the second block 252, or vice versa. Further, as shown in the illustrated embodiment of FIG. 7, one or more of the passageways 266 may be fluidly coupled to one another via an intermediate passageway 267. As such, the rotatable fluid distribution system 249 may be configured to supply pressurized fluid at a substantially equal (e.g., within 10% of, within 5% of, or within 1% of) pressure to one or more of the outlets 258. Additionally, the rotatable fluid distribution system 249 may include multiple positions that supply pressurized fluid to a single actuator, instead of one position per actuator (e.g., as shown in FIGS. 2-6).

Additionally, to vent the pressurized fluid from the rotatable fluid distribution system 249, a vent passageway 268 (see, e.g., FIG. 8) may be aligned with and/or coupled to the vent port 262 and one of the passageways 266. Accordingly, pressurized fluid may flow from a target outlet 256 through a target passageway 266 and discharged through the vent port 262 to the fluid discharge tank 263. As discussed in detail below, the first block 250 and/or the second block 252 may be rotated with respect to one another in order to align the vent passageway 268, the vent port 262, a respective passageway 266, and a respective outlet 256 in order to vent the pressurized fluid from a target component and out of the rotatable fluid distribution system 249 (e.g., to the fluid discharge tank 263).

Figure 8:
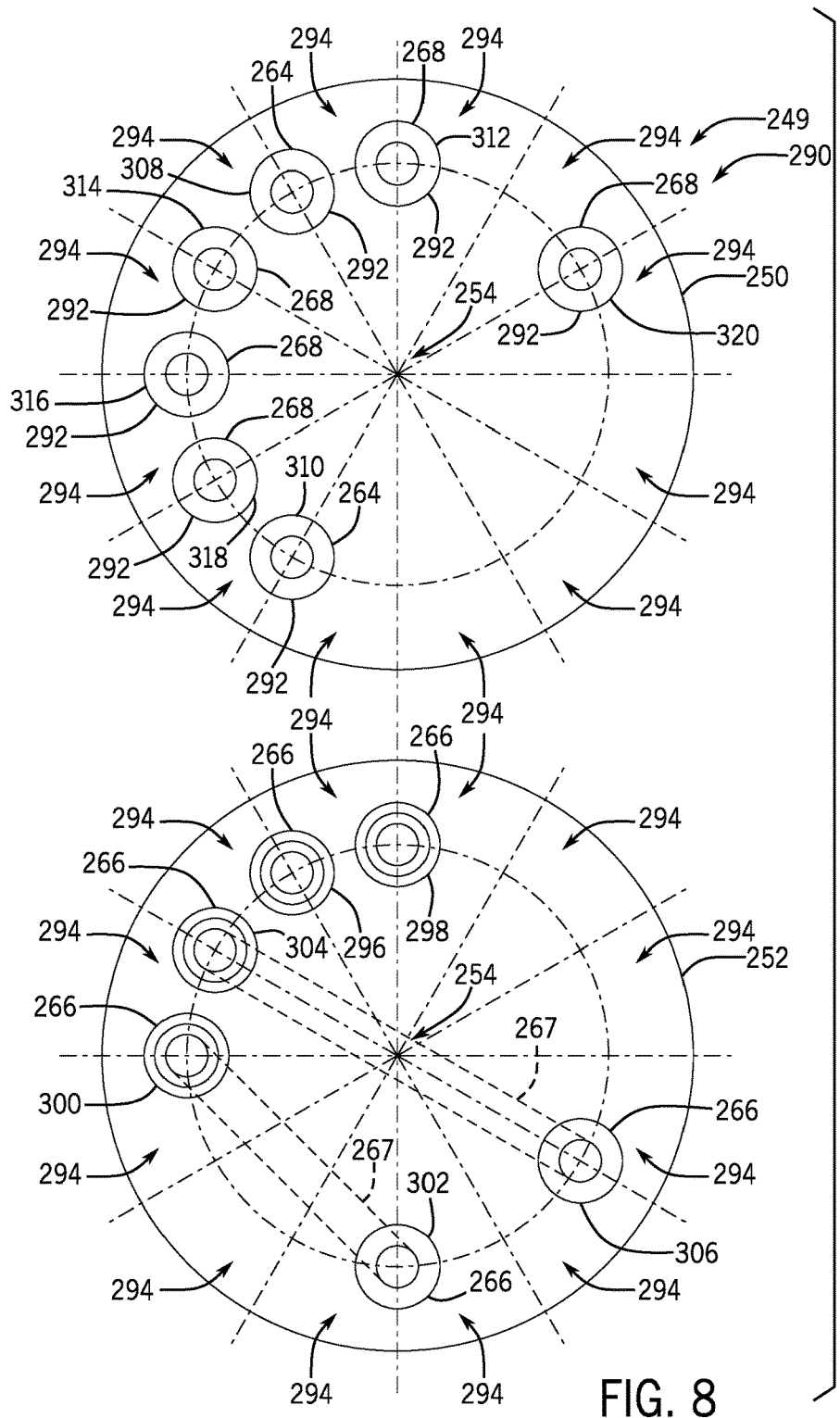
FIG. 8 is a cross section of the rotatable fluid distribution system in a first position taken along line 8-8 of FIG. 7, in accordance with an aspect of the present disclosure.

For example, FIG. 8 is a cross section of the rotatable fluid distribution system 249 taken along line 8-8 of FIG. 7, where the first block 250 and the second block 252 of the rotatable fluid distribution system 249 are in a first position 290. As shown in the illustrated embodiment of FIG. 8, the first block 250 is shown positioned above the second block 252 to clarify the positions (e.g., alignments) of the passageways 264, 266, and/or 268 of both the first block 250 and the second block 252 when in the first position 290. In some embodiments, the first block 250 may include seven passageways 292, where two of the passageways 292 may be supply passageways 264 and four of the passageways 292 may be vent passageways 268. Additionally, the second block 252 may include six of the passageways 266. While the illustrated embodiment of FIG. 8 shows the first block 250 having seven of the passageways 292 and the second block 252 having six of the passageways 266, in other embodiments, the first block 250 may have more or less than seven passageways 292 (e.g., 1, 2, 3, 4, 5, 6, 8, 9, 10, or more of the passageways 292) and the second block 252 may have more or less than six of the passageways 266 (e.g., 1, 2, 3, 4, 5, 7, 8, 9, 10, or more of the passageways 266).

In any case, when one or both of the supply passageways 264 is aligned with one or more of the passageways 266, one or more respective target components may be actuated as pressurized fluid is directed to the one or more respective target components. Similarly, when one or more of the vent passageways 268 are aligned with one or more of the passageways 266, pressurized fluid may be discharged from one or more of respective target components and to a fluid source (e.g., a hydraulic fluid tank or reservoir).

As shown in the illustrated embodiment of FIG. 8, the passageways 292 and/or 266 may be spaced along equally sized portions 294 of the first block 250 and the second block 252. In some embodiments, each portion 294 may represent a twelfth of the first block 250 and/or a twelfth of the second block 252. However, in other embodiments, the portions 294 may represent other amounts of the first block 250 and/or the second block 252, such as one sixth, one seventh, one eighth, one ninth, one tenth, one fifteenth, one twentieth, or any other suitable amount.

As a non-limiting example, some or all of the six passageways 266 may be coupled to a different component of the running tool 34 and/or the wellhead component. For example, a first passageway 296 may be fluidly coupled to a first actuator 297 (see, e.g., FIG. 7), such as a piston, that controls one or more locking components (e.g., lock dogs) of the running tool 34. The first passageway 296 may be configured to supply pressurized fluid to unsecure (e.g., unenergize and/or decouple) the one or more locking components. As used herein, the one or more locking components may be a component of the running tool 34 that is configured to secure the running tool 34 to a surface of the wellhead assembly 14, such that the running tool 34 may be secure before installing the wellhead component (e.g., tubing hangers, casing hangers, tubing spool, casing spool, packoff assembly, valves, seal assemblies, lock members, actuators, accumulators, blowout preventers (BOPs), pumps, plugs, a wellhead assembly, etc.). Additionally, a second passageway 298 may also be fluidly coupled to the first actuator 297 (e.g., the piston) that controls the one or more locking components (e.g., lock dogs). However, the second passageway 298 may be configured to supply pressurized fluid that engages (e.g., secures) the one or more locking components with the surface of the wellhead assembly 14.

In some embodiments, the first passageway 296 may be configured to move the first actuator 297 (e.g., the piston) in a first axial direction (or a first radial or circumferential direction), such that the one or more locking components are not engaged with the surface of the wellhead assembly 14. Similarly, the second passageway 298 may be configured to move the first actuator 297 (e.g., the piston) in a second axial direction, opposite the first axial direction (or a second radial or circumferential direction, opposite the first radial or circumferential direction) to engage the one or more locking components with the surface of the wellhead assembly 14. Thus, the first actuator 297 may be disposed in a chamber, and the first passageway 296 may be fluidly coupled to a first end portion of the chamber and the second passageway 298 may be fluidly coupled to a second end portion of the chamber.

A third passageway 300 and a fourth passageway 302 may both be fluidly coupled to a second actuator 303 (see, e.g., FIG. 7) configured to control a seal assembly of the wellhead component, which may be configured to form a seal between a tubular and the wellhead component when the pressurized fluid is supplied to the third passageway 300 and the fourth passageway 302. Utilizing the third passageway 300 and the fourth passageway 302 to actuate the second actuator 303 may enhance a performance of the running tool 34 when the second actuator 303 includes multiple input pressure ports. Accordingly, the third passageway 300 and the fourth passageway 302 may each supply a substantially equal amount (e.g., within 10% of, within 5%, or within 1%) of pressure to the multiple pressure ports. In any case, pressurized fluid in the third passageway 300 and the second passageway 302 may move the second actuator 303, which may engage the seal assembly of the wellhead component to form the seal between the tubular and the wellhead component.

Further, a fifth passageway 304 and a sixth passageway 306 may be fluidly coupled to a third actuator 307 (see, e.g., FIG. 7) that controls a lock member of the wellhead component which may be configured to secure the wellhead component in the wellhead assembly 14 and/or to form a seal between the wellhead component and the wellhead assembly 14. Accordingly, pressurized fluid in the fifth passageway 304 and the sixth passageway 306 may move the third actuator 307 to engage the lock member of the wellhead component to secure the wellhead component in the wellhead assembly 14. While the present discussion focuses on the respective passageways 266 being coupled to the specific components listed above, it should be understood that the respective passageways 266 may be coupled to any suitable component of the mineral extraction system 10 that may be controlled via pressurized fluid (e.g., hydraulic fluid and/or pneumatic fluid).

As shown in the illustrated embodiment of FIG. 8, a first supply passageway 308 (e.g., of the passageways 292) is aligned with the first passageway 296. A second supply passageway 310 (e.g., of the passageways 292) is not aligned with any of the passageways 266. Accordingly, pressurized fluid may be supplied to the first actuator 297 in order to unsecure (e.g., unenergize and/or deactivate) the one or more locking components of the running tool 34 when the first block 250 and the second block 252 are in the first position 290. Therefore, when the first block 250 and the second block 252 are in the first position 290, the running tool 34, which may be coupled to the wellhead component, may be disposed into the wellhead assembly 14 because the one or more locking components may be deactivated. When the one or more locking components are deactivated, the running tool 34 may be disposed into the wellhead assembly 14 without obstruction.

Further, when the first block 250 and the second block 252 are in the first position 290, a first vent passageway 312 (e.g., of the passageways 292) is aligned with the second passageway 298, a second vent passageway 314 (e.g., of the passageways 292) is aligned with the fifth passageway 304, and a third vent passageway 316 (e.g., of the passageways 292) is aligned with the third passageway 300. In some embodiments, the second supply passageway 310 (e.g., of the passageways 292), a fourth vent passageway 318 (e.g., of the passageways 292), and/or a fifth vent passageway 320 (e.g., of the passageways 292) may not be aligned with any of the passageways 266. When the first, second, and third vent passageways 312, 314, and 316 are aligned with the second, fifth, and third passageways 298, 304, and 300, respectively, any pressurized fluid in the second, third, fourth, fifth, and/or sixth passageways 298, 300, 302, 304, and 306 may be discharged from the second, fifth, and third passageways 298, 304, and 300. Accordingly, pressurized fluid is not supplied to the second, third, fourth, fifth, and sixth passageways 298, 300, 302, 304, and 306. Therefore, the one or more locking components of the running tool 34, the seal assembly of the wellhead component, and/or the lock member of the wellhead component are not engaged when the first block 250 and the second block 252 are in the first position 290.

Figure 9:
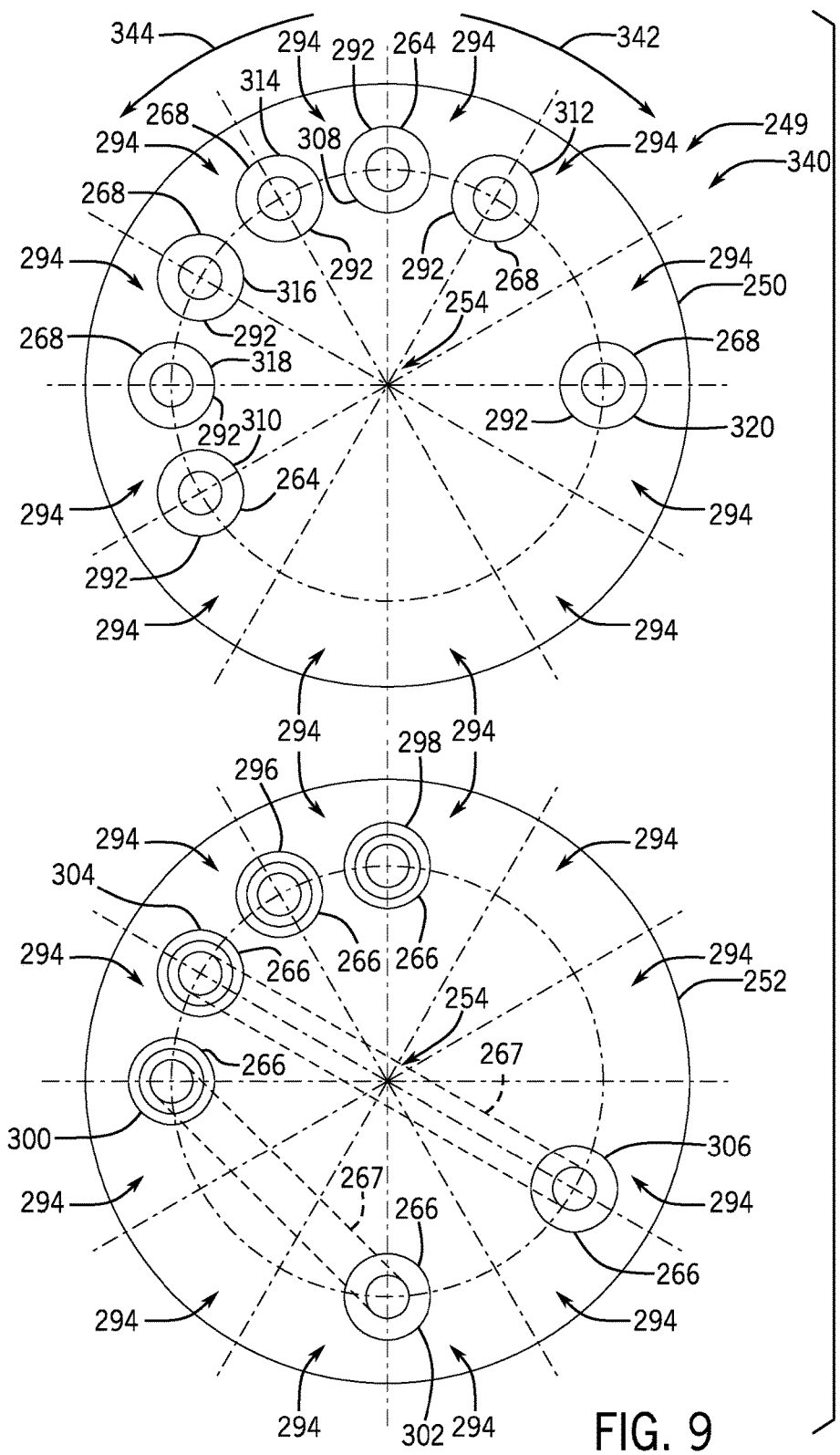
FIG. 9 is a cross section of the rotatable fluid distribution system in a second position taken along line 8-8 of FIG. 7, in accordance with an aspect of the present disclosure.

FIG. 9 is a cross section of the rotatable fluid distribution system 249 taken along line 8-8 of FIG. 7, where the first block 250 and the second block 252 of the rotatable fluid distribution system 249 are in a second position 340. In some embodiments, to move from the first position 290 to the second position 340, the first block 250 and/or the second block 252 may be rotated between 20 degrees and 40 degrees, between 25 degrees and 35 degrees, or approximately (e.g., within 1% of, within 5% of, or within 10% of) 30 degrees with respect to one another. As such, the first block 250 may be rotated about the axis 254 (e.g., in a first circumferential direction 342) while the second block 252 remains substantially stationary, the second block 252 may be rotated about the axis 254 (e.g., in a second circumferential direction 344) while the first block 250 remains substantially stationary, or the first block 250 may be rotated (e.g., in the first circumferential direction 342) about the axis 254 at the same time that the second block 250 is rotated (e.g., in the second circumferential direction 344) about the axis 254.

In any case, as shown in the illustrated embodiment of FIG. 9, the first supply passageway 308 (e.g., of the passageways 292) is aligned with the second passageway 298. However, the second supply passageway 310 (e.g., of the passageways 292) not aligned with any of the passageways 266. Accordingly, pressurized fluid may be supplied to the first actuator 297 in order to engage the one or more locking components (e.g., lock dogs) of the running tool 34 when the first block 250 and the second block 252 are in the second position 340. Therefore, once the running tool 34 has reached a target position within the wellhead assembly 14, the first block 250 and the second block 252 may be placed into the second position 340, such that pressurized fluid may be directed into the second passageway 298 to engage the one more locking components. Therefore, the running tool 34 may be secured within the wellhead assembly 14 at the target position before engaging the wellhead component in the wellhead assembly 14.

Further, when the first block 250 and the second block 252 are in the second position 340, the second vent passageway 314 (e.g., of the passageways 292) is aligned with the first passageway 296, the third vent passageway 316 (e.g., of the passageways 292) is aligned with the fifth passageway 304, and the fourth vent passageway 318 (e.g., of the passageways 292) is aligned with the third passageway 300. In some embodiments, the first vent passageway 312 (e.g., of the passageways 292) and/or the fifth vent passageway 320 (e.g., of the passageways 292) may not be aligned with any of the passageways 266. When the second, third, and fourth vent passageways 314, 316, and 318 are aligned with the first, fifth, and third passageways 296, 304, 300, respectively, any pressurized fluid in the first, third, fourth, fifth, and/or sixth passageways 296, 300, 302, 304, and 306 may be discharged from the first, fifth, and third passageways 296, 304, 300. Accordingly, pressurized fluid is not be supplied to the first, third, fourth, fifth, and/or sixth passageways 296, 300, 302, 304, and 306 when the first block 250 and the second block 252 are in the second position 340. As such, the one or more locking components of the running tool 34 are not disengaged, the seal assembly of the wellhead component is not engaged, and the lock member of the wellhead component is not engaged when the first block 250 and the second block 252 are in the second position 340.

Figure 10:
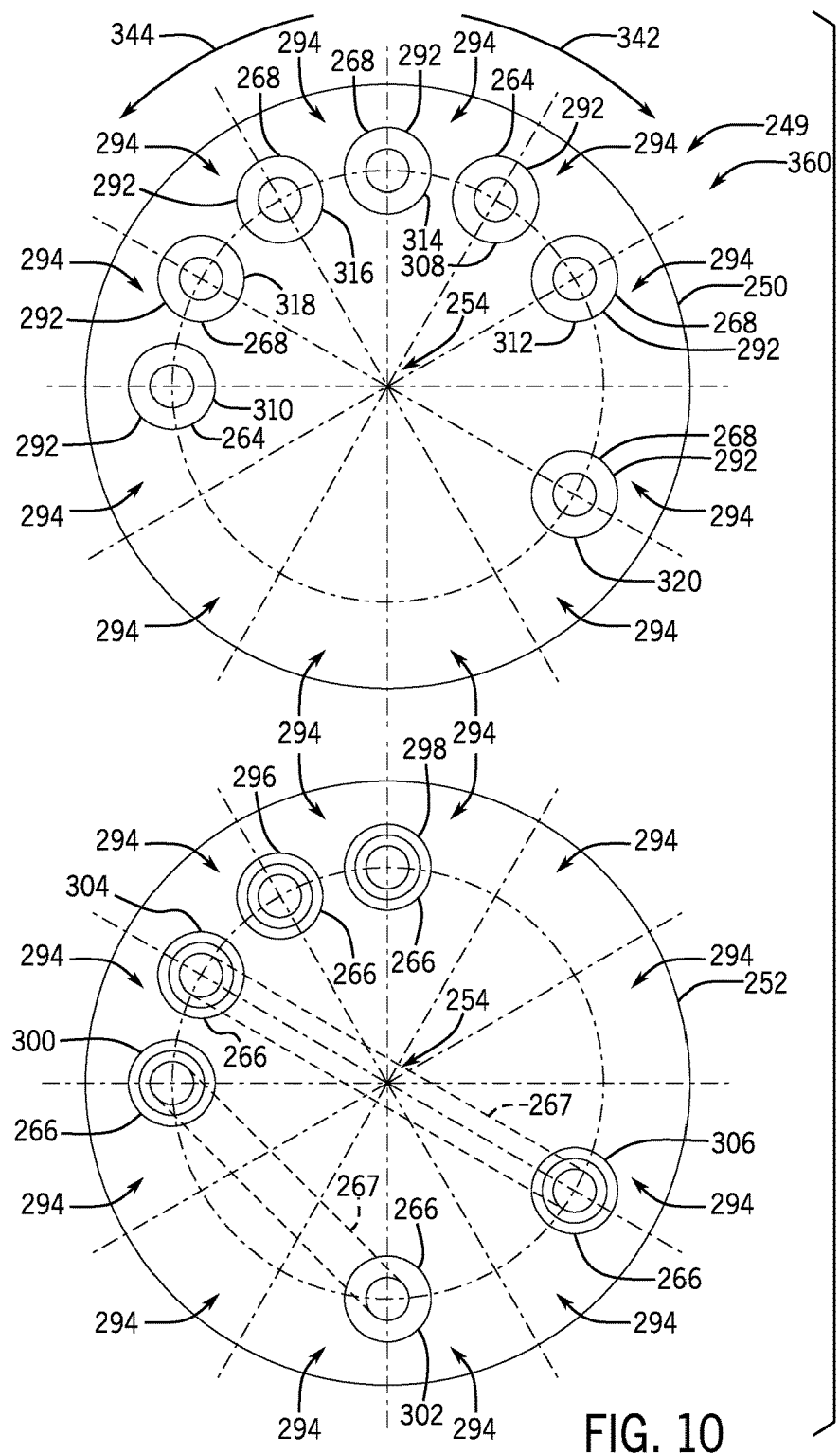
FIG. 10 is a cross section of the rotatable fluid distribution system in a third position taken along line 8-8 of FIG. 7, in accordance with an aspect of the present disclosure.

FIG. 10 is a cross section of the rotatable fluid distribution system 249 taken along line 8-8 of FIG. 7, where the first block 250 and the second block 252 of the rotatable fluid distribution system 249 are in a third position 360. In some embodiments, to move from the second position 340 to the third position 360, the first block 250 and/or the second block 252 may be rotated between 20 degrees and 40 degrees, between 25 degrees and 35 degrees, or approximately (e.g., within 1% of, within 5% of, or within 10% of) 30 degrees with respect to one another. As such, the first block 250 may be rotated about the axis 254 (e.g., in the first circumferential direction 342) while the second block 252 remains substantially stationary, the second block 252 may be rotated about the axis 254 (e.g., in the second circumferential direction 344) while the first block 250 remains substantially stationary, or the first block 250 may be rotated (e.g., in the first circumferential direction 342) about the axis 254 at the same time that the second block 252 is rotated (e.g., in the second circumferential direction 344) about the axis 254.

In any case, as shown in the illustrated embodiment of FIG. 10, the first supply passageway 308 (e.g., of the passageways 292) is not aligned with any of the passageways 266. However, the second supply passageway 310 (e.g., of the passageways 292) is aligned with the third passageway 300. Accordingly, pressurized fluid may be supplied to toward the second actuator 303 to engage the seal assembly of the wellhead component. As discussed above, the second actuator 303 may engage the seal assembly to direct the seal assembly from the wellhead component toward a tubular in the wellhead assembly 14. Thus, the seal assembly forms a seal between the wellhead component and the tubular when the first block 250 and the second block 252 are in the third position 360.

Further, when the first block 250 and the second block 252 are in the third position 360, the second vent passageway 314 (e.g., of the passageways 292) is aligned with the second passageway 298, the third vent passageway 316 (e.g., of the passageways 292) is aligned with the first passageway 296, the fourth vent passageway 318 is aligned with the fifth passageway 304, and the fifth vent passageway 320 is aligned with the sixth passageway 306. The first vent passageway 312 may not be aligned with any of the passageways 266. When the second vent passageway 314 (e.g., of the passageways 292) is aligned with the second passageway 298, the third vent passageway 316 (e.g., of the passageways 292) is aligned with the first passageway 296, the fourth vent passageway 318 is aligned with the fifth passageway 304, and the fifth vent passageway 320 is aligned with the sixth passageway 306 any pressurized fluid in the first, second, fifth and sixth passageways 296, 298, 304, and 306 may be discharged from the first, second, fifth and sixth passageways 296, 298, 304, and 306. Accordingly, pressurized fluid is not supplied to the first, second, fifth and sixth passageways 296, 298, 304, and 306 to actuate the one or more locking components of the running tool 34 and the lock member of the wellhead component when the first block 250 and the second block 252 are in the third position 360. In some embodiments, venting the fifth and sixth passageways 304 and 306 when actuating the third passageway 300 may enable the running tool 34 to engage the seal assembly and the lock member of the wellhead component separate from one another and ensure a proper seal between the tubular, the wellhead component, and the wellhead assembly 14.

Figure 11:
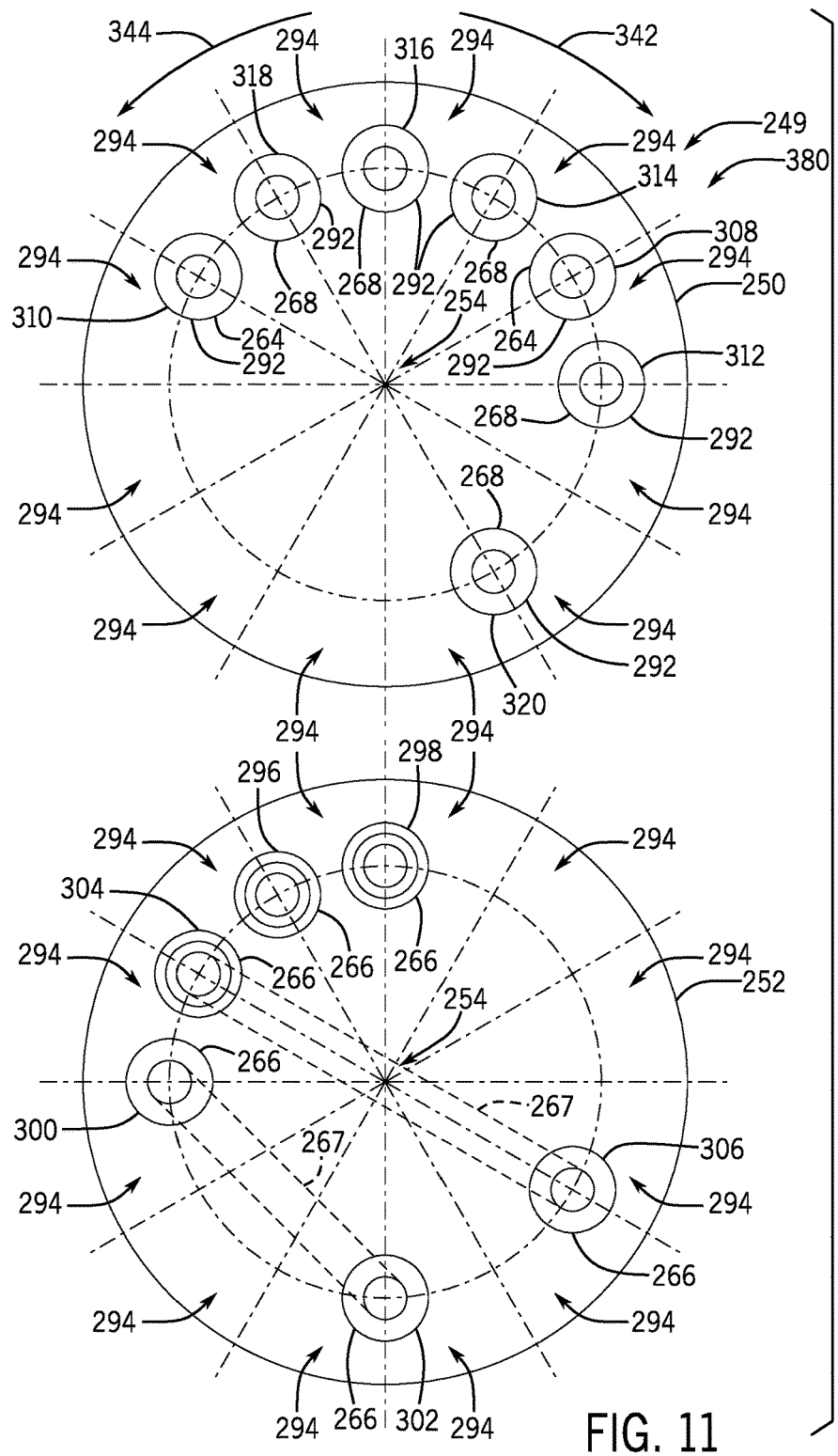
FIG. 11 is a cross section of the rotatable fluid distribution system in a fourth position taken along line 8-8 of FIG. 7, in accordance with an aspect of the present disclosure.

FIG. 11 is a cross section of the rotatable fluid distribution system 249 taken along line 8-8 of FIG. 7, where the first block 250 and the second block 252 of the rotatable fluid distribution system 249 are in a fourth position 380. In some embodiments, to move from the third position 360 to the fourth position 380, the first block 250 and/or the second block 252 may be rotated between 20 degrees and 40 degrees, between 25 degrees and 35 degrees, or approximately (e.g., within 1% of, within 5% of, or within 10% of) 30 degrees with respect to one another. As such, the first block 250 may be rotated about the axis 254 (e.g., in the first circumferential direction 342) while the second block 252 remains substantially stationary, the second block 252 may be rotated about the axis 254 (e.g., in the second circumferential direction 344) while the first block 250 remains substantially stationary, or the first block 250 may be rotated (e.g., in the first circumferential direction 342) about the axis 254 at the same time that the second block 252 is rotated (e.g., in the second circumferential direction 344) about the axis 254.

In any case, as shown in the illustrated embodiment of FIG. 11, the second supply passageway 310 (e.g., of the passageways 292) is aligned with the fifth passageway 304. However, the first supply passageway 308 (e.g., of the passageways 292) is not aligned with any of the passageways 266. Accordingly, the lock member of the wellhead component may be engaged when the first block 250 and the second block 252 are in the fourth position 380 to secure the wellhead component in the wellhead assembly 14.

Further, when the first block 250 and the second block 252 are in the fourth position 380, the third vent passageway 316 (e.g., of the passageways 292) is aligned with the second passageway 298 and the fourth vent passageway 318 (e.g., of the passageways 292) is aligned with the first passageway 296. However, the first vent passageway 312, the second vent passageway 314, and the fifth vent passageway 320 may not be aligned with any of the passageways 266. When the third vent passageway 316 is aligned with the second passageway 298 and the fourth vent passageway 318 is aligned with the first passageway 296, pressurized fluid is not supplied to the first passageway 296 and the second passageway 298, such that the one or more locking components of the running tool 34 remain in a previous position and are not actuated when the first block 250 and the second block 252 are in the fourth position 380 (e.g., fluid in the passageways 296 and 298 may not be supplied or discharged, such that the one or more locking components of the running tool 34 do not change position). As shown in FIGS. 8 and 9, when a supply passageway 308 and/or 310 is aligned with the first passageway 296, a vent passageway 312, 314, 316, 318, and/or 320 is aligned with the second passageway 298, and vice versa. Accordingly, pressurized fluid is not supplied to the first actuator 297 to both engage and disengage the one or more locking components of the running tool 34 when the rotatable fluid distribution system 249 is in a given position.

Figure 12:
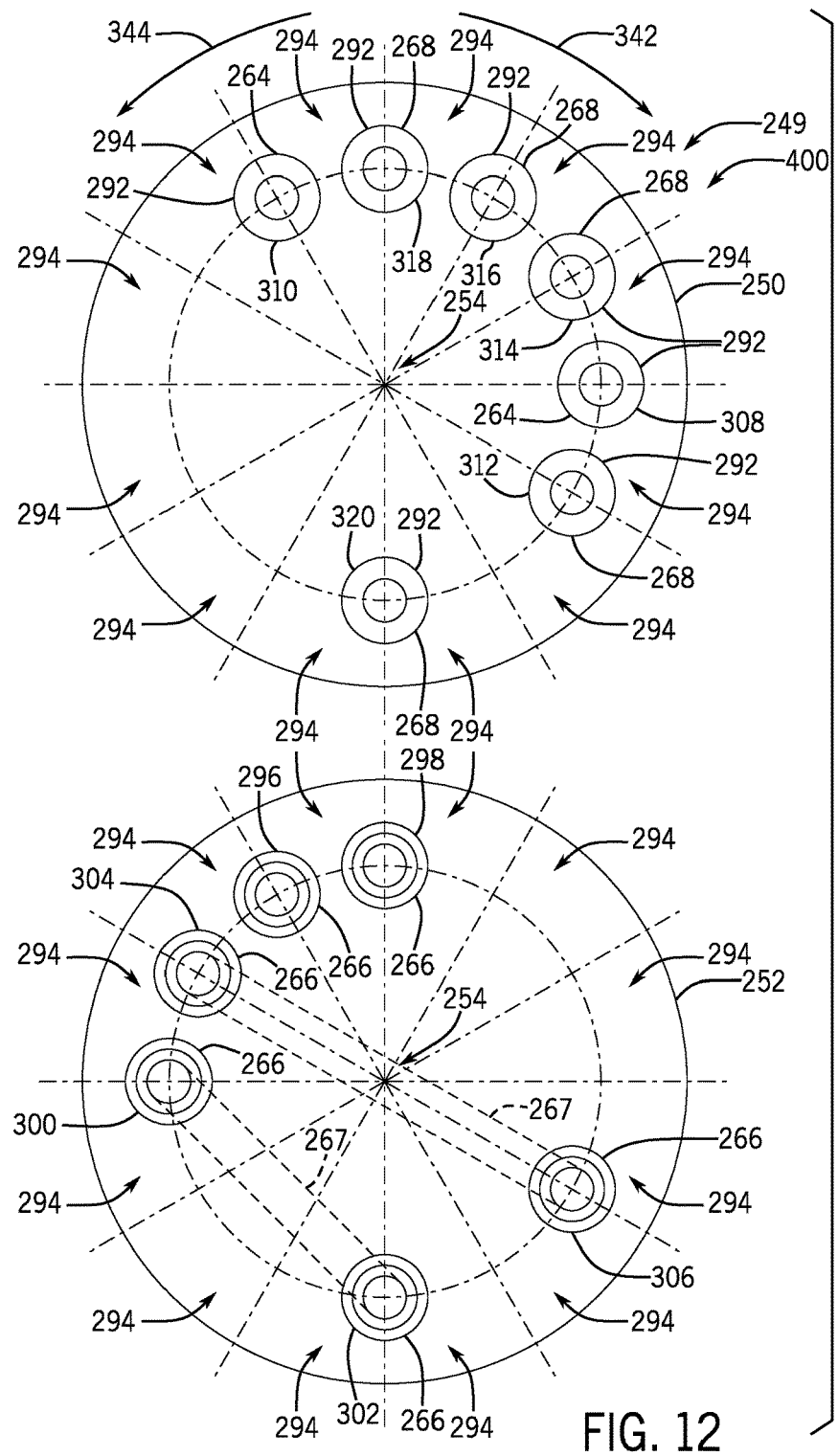
FIG. 12 is a cross section of the rotatable fluid distribution system in a fifth position taken along line 8-8 of FIG. 7, in accordance with an aspect of the present disclosure.

In some embodiments, the first block 250 and the second block 252 may be adjusted to a fifth position 400 from the fourth position 380 in order to remove the running tool 34 from the wellhead assembly 14 (e.g., while the hanger, the seal assembly, the packoff assembly, or other suitable component is still in the wellhead assembly 14), as shown in FIG. 12. In some embodiments, to move from the fourth position 380 to the fifth position 400, the first block 250 and/or the second block 252 may be rotated between 20 degrees and 40 degrees, between 25 degrees and 35 degrees, or approximately (e.g., within 1% of, within 5% of, or within 10% of) 30 degrees with respect to one another. As such, the first block 250 may be rotated about the axis 254 (e.g., in the first circumferential direction 342) while the second block 252 remains substantially stationary, the second block 252 may be rotated about the axis 254 (e.g., in the second circumferential direction 344) while the first block 250 remains substantially stationary, or the first block 250 may be rotated (e.g., in the first circumferential direction 342) about the axis 254 at the same time that the second block 252 is rotated (e.g., in the second circumferential direction 344) about the axis 254. However, in other embodiments, the first block 250 and the second block 252 may be moved from the fourth position 380 back to the first position 290 to remove the running tool 34 from the wellhead assembly 14. In such embodiments, the first block 250 and/or the second block 252 may be rotated between 30 degrees and 50 degrees, between 40 degrees and 50 degrees, or approximately (e.g., within 1% of, within 5% of, or within 10% of) 45 degrees with respect to one another.

In any case, the first supply passageway 308 (e.g., of the passageways 292) or the second supply passageway 310 is aligned with the first passageway 296. Accordingly, pressurized fluid may be supplied to the first actuator 297 in order to unsecure (e.g., unenergize and/or deactivate) the one or more locking components of the running tool 34 when the first block 250 and the second block 252 are in the fifth position 400 and/or the first position 290. Therefore, when the first block 250 and the second block 252 are in the fifth position 400 and/or the first position 140, the running tool 34, which may be decoupled from the wellhead component, may be removed from the wellhead assembly 14 because the one or more locking components may be deactivated. When the one or more locking components are deactivated, the running tool 34 may be removed from the wellhead assembly 14 without obstruction.

Figure 13:
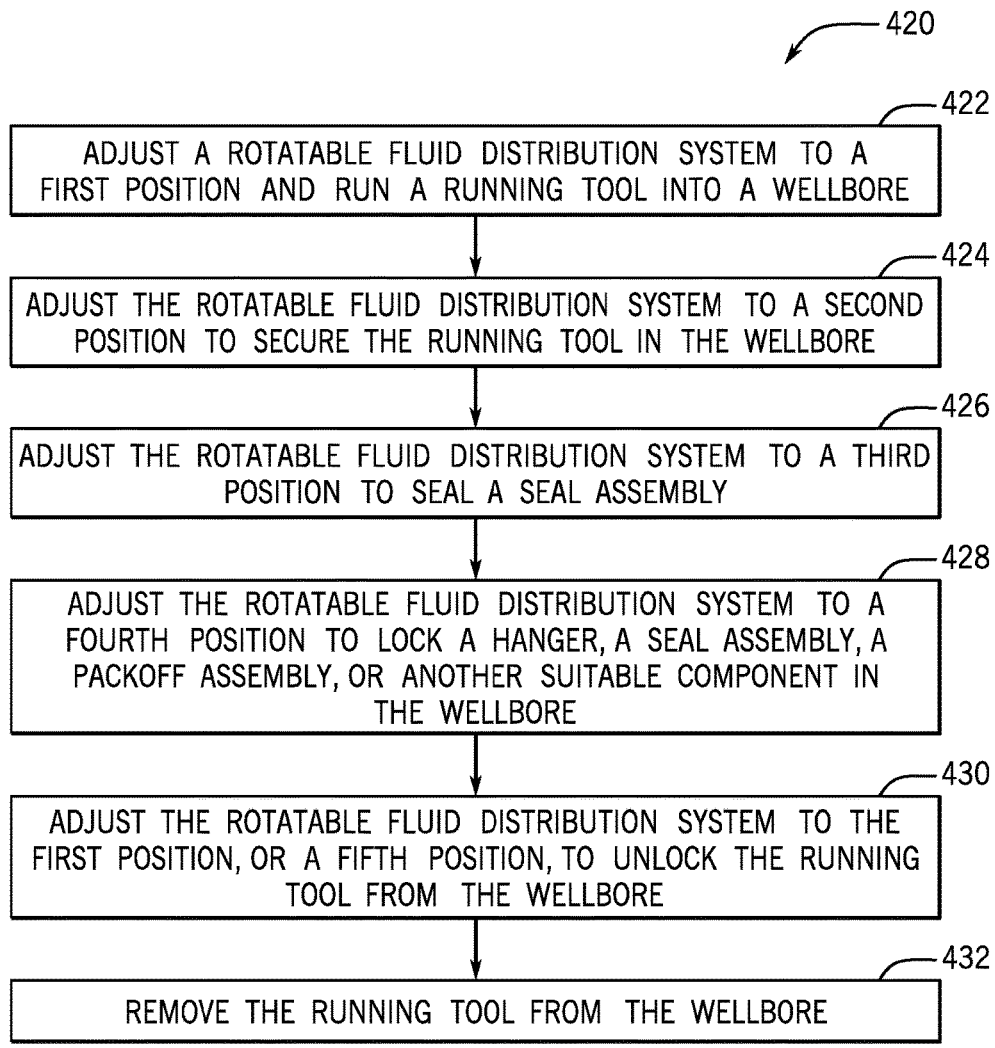
FIG. 13 is a flow chart of an embodiment of a process that may utilize the rotatable fluid distribution system to run, seal, and lock a hanger, a seal assembly, a packoff assembly, or another suitable component into a wellbore, in accordance with an aspect of the present disclosure.

FIG. 13 is a flow chart of an embodiment of a process 420 that may utilize the rotatable fluid distribution system 100, 249 to run a wellhead component (e.g., tubing hangers, casing hangers, tubing spool, casing spool, packoff assembly, valves, seal assemblies, lock members, actuators, accumulators, blowout preventers (BOPs), pumps, plugs, a wellhead assembly, etc.) into the wellhead assembly 14, secure the wellhead component in the wellhead assembly 14, and remove the running tool 34 from the wellhead assembly 14. For example, at block 422, the rotatable fluid distribution system 100, 249 may be adjusted to the first position 140, 290, such that the running tool 34 may be run into the wellhead assembly 14. In some embodiments, the rotatable fluid distribution system 100, 249 may already be in the first position 140, 290, such that the rotating blocks 100, 249 are not adjusted before running the running tool 34 into the wellhead assembly 14.

In any case, at block 424, the rotatable fluid distribution system 100, 249 may be adjusted from the first position 140, 290 to the second position 180, 340 once the running tool 34 is run into the wellhead assembly 14. As discussed above, when the rotating blocks 100, 249 are in the second position 180, 340 pressurized fluid may be supplied to the first actuator 297 to actuate the one or more locking components of the running tool 34 and secure the running tool 34 in the wellhead assembly 14. At block 426, the rotating blocks 100, 249 may be adjusted from the second position 180, 340 to the third position 200, 360. As discussed above, when the rotating blocks 100, 249 are in the third position 200, 360 pressurized fluid may be supplied to the second actuator 303 to engage the seal assembly of the wellhead component, which may be configured to form a seal between a tubular and the wellhead component. Further, at block 428, the rotating blocks 100, 249 may be adjusted from the third position 200, 360 to the fourth position 220, 380. As discussed above, when the rotatable fluid distribution system 100, 249 are in the fourth position 220, 380, pressurized fluid may be supplied to the third actuator 307 to engage the lock member of the wellhead component to secure the wellhead component in the wellhead assembly 14.

Once the wellhead component is sealed and locked in the wellhead assembly 14, the rotatable fluid distribution system 100, 249 may be adjusted back to the first position 140, 290, or to the fifth position 400, to disengage the one or more locking components of the running tool 34, as shown at block 430. Accordingly, the running tool 34 may be removed from the wellhead assembly 14 while the wellhead component is sealed and locked in the wellhead assembly 14, as shown at block 432. The rotatable fluid distribution system 100, 249 reduce a number of control lines that may be included in the running tool 34, and thus, may reduce a size, costs, and/or a complexity of the running tool 34.

While the disclosed subject matter may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims.

The invention claimed is:

1. A system, comprising:
a rotatable fluid distribution system comprising a first block and a second block, wherein the first block is configured to receive a supply of pressurized fluid, wherein the second block is configured to distribute the supply of pressurized fluid to one or more actuators of a running tool, a wellhead component, or both, wherein the first block comprises a first plurality of passageways spaced about first portions of the first block, wherein the second block comprises a second plurality of passageways spaced about second portions of the second block, wherein the first plurality of passageways comprises a supply passageway and a vent passageway, wherein the second plurality of passageways is coupled to the one or more actuators of the running tool, the wellhead component, or both, and wherein the first block and the second block are configured to rotate with respect to one another about an axis to adjust which of the one or more actuators of the running tool, the wellhead component, or both, receives the supply of pressurized fluid.

2. The system of claim 1, wherein each of the first portions are one eighth or one twelfth of the first block and each of the second portions are one eighth or one twelfth of the second block.

3. The system of claim 1, wherein an actuator of the one or more actuators is configured to be engaged when the supply passageway of the first plurality of passageways aligns with an additional passageway of the second plurality of passageways coupled to the actuator.

4. The system of claim 1, wherein fluid in an additional passageway of the second plurality of passageways is configured to discharge from the additional passageway when the additional passageway is aligned with the vent passageway of the first plurality of passageways.

5. The system of claim 1, wherein the one or more actuators comprise an actuator coupled to one or more locking components of the running tool, such that the actuator is configured to engage the one or more locking components to secure the running tool in the wellbore, disengage the one or more locking components to remove the running tool from the wellbore, or both.

6. The system of claim 1, wherein the one or more actuators comprise an actuator coupled to a seal assembly of the wellhead component, such that the actuator is configured to engage the seal assembly to form a seal between the wellhead component and a tubular.

7. The system of claim 1, wherein the one or more actuators comprise an actuator coupled to a lock member of the wellhead component, such that the actuator is configured to engage the lock member to secure the wellhead component in the wellbore.

8. A method, comprising:
adjusting a rotatable fluid distribution system of a running tool to a first position;
running the running tool into a wellbore;
adjusting the rotatable fluid distribution system to a second position to actuate one or more locking components of the running tool and secure the running tool in the wellbore;
adjusting the rotatable fluid distribution system to a third position to actuate a seal assembly of a wellhead component and seal the wellhead component to a tubular;
adjusting the rotatable fluid distribution system to a fourth position to actuate a lock member of the wellhead component and secure the wellhead component to the wellbore;
adjusting the rotatable fluid distribution system to the first position or a fifth position to unsecure the one or more locking components;
removing the running tool from the wellbore.

9. The method of claim 8, wherein adjusting the rotatable fluid distribution system to the first position, the second position, the third position, the fourth position, the fifth position, or a combination thereof, comprises actuating a drive configured to rotate a first block of the rotatable fluid distribution system, a second block of the rotatable fluid distribution system, or both the first block and the second block.

10. The method of claim 9, wherein actuating the drive configured to rotate the first block of the rotatable fluid distribution system, the second block of the rotatable fluid distribution system, or both the first block and the second block comprises rotating the first block at a predetermined angle about an axis.

11. The method of claim 8, wherein adjusting the rotatable fluid distribution system to the second position to actuate the one or more locking components of the running tool and secure the running tool in the wellbore comprises aligning a first passageway of a first block of the rotatable fluid distribution system with a second passageway of a second block of the rotatable fluid distribution system, wherein the first passageway is coupled to a supply line of pressurized fluid, and wherein the second passageway is coupled to a first actuator configured to engage the one or more locking components of the running tool.

12. The method of claim 11, wherein adjusting the rotatable fluid distribution system to a third position to actuate a seal assembly of a wellhead component and seal the wellhead component to a tubular comprises aligning the first passageway of the first block of the rotatable fluid distribution system with a third passageway of the second block of the rotatable fluid distribution system, wherein the third passageway is coupled to a second actuator configured to engage the seal assembly of the wellhead component.

13. The method of claim 12, wherein adjusting the rotatable fluid distribution system to a fourth position to actuate a lock member of the wellhead component and secure the wellhead component to the wellbore comprises aligning the first passageway of the first block of the rotatable fluid distribution system with a fourth passageway of the second block of the rotatable fluid distribution system, wherein the fourth passageway is coupled to a third actuator configured to engage the lock member of the wellhead component.

14. A system, comprising:
a wellhead component configured to be disposed in a wellbore;
a running tool configured to run the wellhead component into the wellbore; and
a rotatable fluid distribution system comprising a first block and a second block, wherein the first block is configured to receive a supply of pressurized fluid, wherein the second block is configured to distribute the supply of pressurized fluid to one or more actuators of a running tool, a wellhead component, or both, wherein the first block comprises a first plurality of passageways spaced about first portions of the first block, wherein the second block comprises a second plurality of passageways spaced about second portions of the second block, wherein the first plurality of passageways comprises a supply passageway and a vent passageway, wherein the second plurality of passageways is coupled to the one or more actuators of the running tool, the wellhead component, or both, and wherein the first block and the second block are configured to rotate with respect to one another about an axis to adjust which of the one or more actuators of the running tool, the wellhead component, or both, receives the supply of pressurized fluid.

* * * * *